US008644525B2

(12) United States Patent
Bathurst et al.

(10) Patent No.: US 8,644,525 B2
(45) Date of Patent: *Feb. 4, 2014

(54) VIRTUAL MICROPHONES IN ELECTRONIC CONFERENCING SYSTEMS

(75) Inventors: Tracy A. Bathurst, South Jordan, UT (US); David Lambert, South Jordan, UT (US); Wayne Whiteley, Lindon, UT (US); Carrie L. Owen, Layton, UT (US)

(73) Assignee: Clearone Communications, Inc., Salt Lake City, UT (US)

( * ) Notice: Subject to any disclaimer, the term of this patent is extended or adjusted under 35 U.S.C. 154(b) by 1350 days.

This patent is subject to a terminal disclaimer.

(21) Appl. No.: 10/859,911

(22) Filed: Jun. 2, 2004

(65) Prior Publication Data

US 2005/0271220 A1 Dec. 8, 2005

(51) Int. Cl.
*H04R 3/00* (2006.01)

(52) U.S. Cl.
USPC ....... 381/92; 381/122; 381/94.1; 379/202.01; 700/94

(58) Field of Classification Search
USPC ........ 381/92, 91, 313, 94.1, 111, 57, 56, 122, 381/87; 379/202.01, 201.01, 206.01; 348/14.01, 14.08, 14.09; 455/416; 700/90, 94; 341/122, 126, 144, 155
See application file for complete search history.

(56) References Cited

U.S. PATENT DOCUMENTS

| | | | |
|---|---|---|---|
| 4,008,376 A | 2/1977 | Flanagan et al. | |
| 4,237,339 A | 12/1980 | Bunting et al. | |
| 4,489,442 A | 12/1984 | Anderson et al. | |
| 4,658,425 A | 4/1987 | Julstrom | |
| 5,050,065 A * | 9/1991 | Dartois et al. | 702/57 |
| 5,121,426 A * | 6/1992 | Baumhauer et al. | 379/420.03 |
| 5,283,544 A | 2/1994 | Sakurai et al. | |
| 5,289,544 A | 2/1994 | Franklin | |
| 5,297,210 A | 3/1994 | Julstrom | |

(Continued)

OTHER PUBLICATIONS

Response to Final Office Action and Request for Continued Examination received for U.S. Appl. No. 10/859,903, filed May 5, 2010, 132 Pages.

(Continued)

*Primary Examiner* — Vivian Chin
*Assistant Examiner* — Con P Tran
(74) *Attorney, Agent, or Firm* — TraskBritt, P.C.

(57) ABSTRACT

This disclosure describes a virtual microphone for reducing common-mode noise for an individual pod in a multi-pod conferencing system that includes a base and a plurality of pods for local conference participants to communicate with remote conference participants. The described virtual microphone includes pod processor means and a loudspeaker that couples to a digital to analog converter that converts digital audio to analog audio, where the loudspeaker couples to the pod processor means. In addition, the virtual microphone includes three physical bi-polar microphones positioned at 120-degree intervals in the horizontal resting plane of the pod, where each individual physical microphone connects to a pair of audio ports with each audio port being equal distance from the loudspeaker, and where the physical microphones couple to analog to digital converting means, and further where the physical microphones couple to the pod processor means. Further, the virtual microphone includes virtual microphone means. And, the virtual microphone includes pod echo cancellation means. Further, the virtual microphone includes microphone gating means using a loudness value, a quietness counter, and a noise floor value. And further, the virtual microphone also has the individual pod using the microphone gating means to gate on or off the virtual microphone.

20 Claims, 14 Drawing Sheets

(56) References Cited

U.S. PATENT DOCUMENTS

| | | | |
|---|---|---|---|
| 5,309,517 A | 5/1994 | Barclay | |
| 5,404,461 A | 4/1995 | Olnowich et al. | |
| 5,515,099 A | 5/1996 | Cortjens et al. | |
| 5,787,183 A * | 7/1998 | Chu et al. | 381/92 |
| 6,125,115 A | 9/2000 | Smits | |
| 6,173,059 B1 | 1/2001 | Huang et al. | |
| 6,263,381 B1 | 7/2001 | Freadman | |
| 6,633,647 B1 * | 10/2003 | Markow et al. | 381/92 |
| 6,754,546 B1 | 6/2004 | Hindus et al. | |
| 6,801,611 B2 | 10/2004 | Guccione et al. | |
| 6,839,417 B2 | 1/2005 | Weisman et al. | |
| 6,987,992 B2 | 1/2006 | Hundal et al. | |
| 7,339,605 B2 * | 3/2008 | Rodman et al. | 348/14.07 |
| 7,409,455 B2 | 8/2008 | Giloi et al. | |
| 7,783,063 B2 | 8/2010 | Pocino et al. | |
| 7,864,937 B2 | 1/2011 | Bathurst et al. | |
| 7,916,849 B2 | 3/2011 | Bathurst et al. | |
| 8,031,853 B2 | 10/2011 | Bathurst | |
| 2002/0101981 A1 | 8/2002 | Sugiyama | |
| 2003/0112947 A1 * | 6/2003 | Cohen | 379/202.01 |
| 2003/0138119 A1 | 7/2003 | Pocino et al. | |
| 2004/0058674 A1 | 3/2004 | Yoakum | |
| 2004/0218745 A1 | 11/2004 | O'Toole | |
| 2004/0218752 A1 | 11/2004 | Huang et al. | |
| 2005/0014490 A1 | 1/2005 | Desai et al. | |
| 2005/0053214 A1 | 3/2005 | Reding et al. | |
| 2005/0078172 A1 | 4/2005 | Harville et al. | |
| 2005/0094792 A1 | 5/2005 | Berthoud et al. | |
| 2005/0213739 A1 | 9/2005 | Rodman et al. | |
| 2005/0286696 A1 | 12/2005 | Bathurst et al. | |
| 2005/0286697 A1 | 12/2005 | Bathurst et al. | |
| 2005/0286698 A1 | 12/2005 | Bathurst et al. | |
| 2007/0064925 A1 | 3/2007 | Suzuki et al. | |
| 2008/0049921 A1 | 2/2008 | Davis et al. | |
| 2008/0140415 A1 | 6/2008 | Shostak | |
| 2009/0257568 A1 | 10/2009 | Suder et al. | |

OTHER PUBLICATIONS

Supplemental Response to Non-Final Office Action for U.S. Appl. No. 10/860,602, filed Apr. 21, 2010, 120 Pages.

Supplemental Response to Office Action for U.S. Appl. No. 10/860,602, filed May 6, 2010, 8 Pages.

Response to Non-Final Office Action for U.S. Appl. No. 10/860,604, filed Apr. 27, 2010, 128 Pages.

Supplemental Response to Office Action for U.S. Appl. No. 10/860,604, filed May 6, 2010, 15 Pages.

* cited by examiner

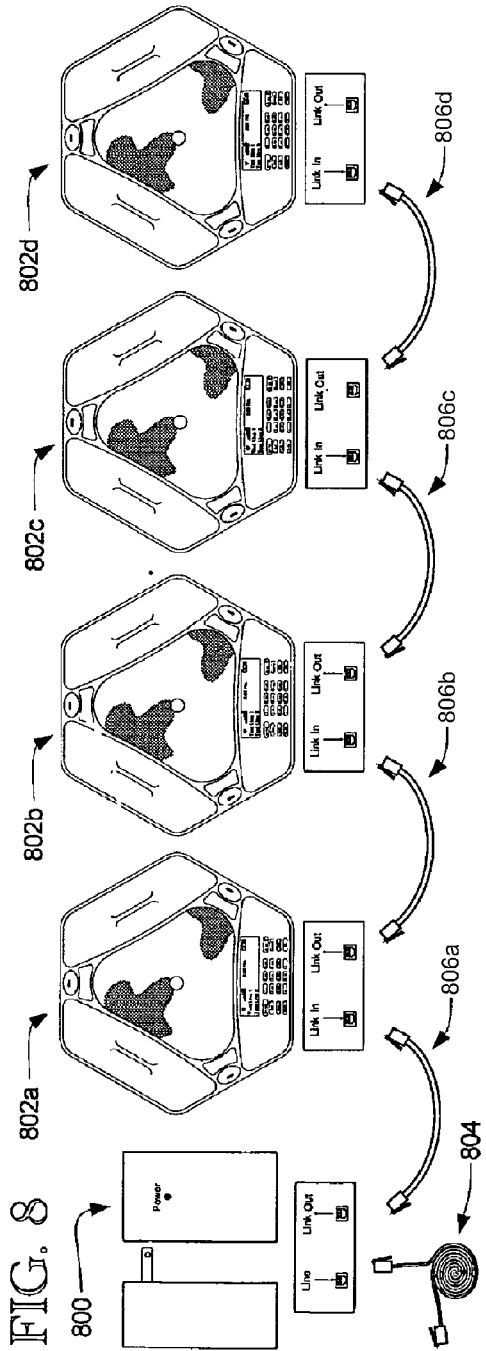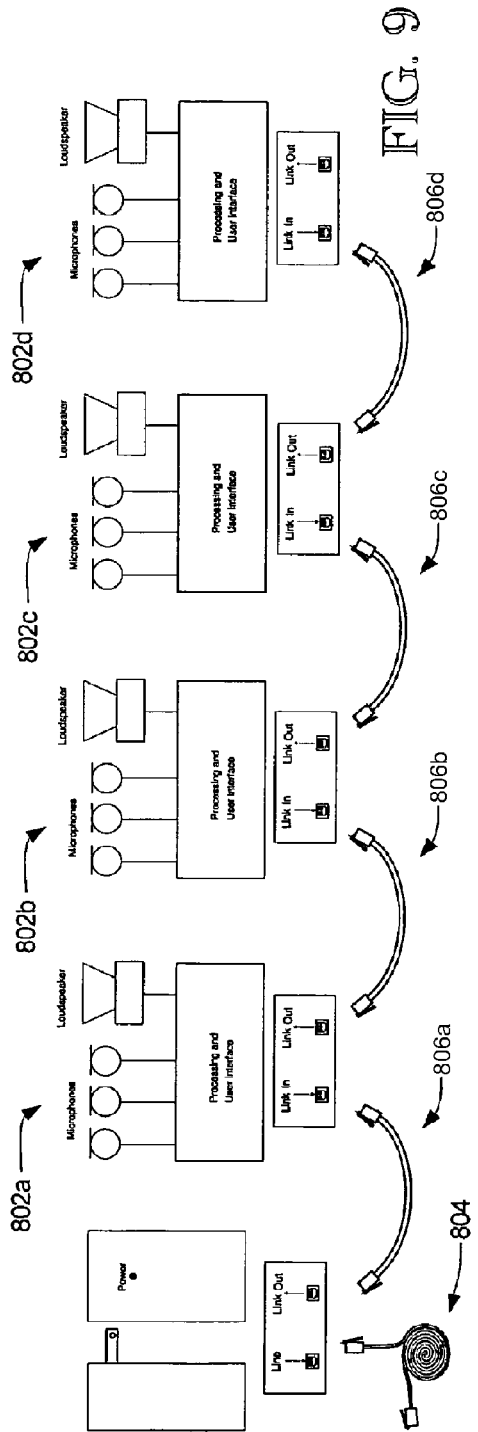

VIRTUAL MICROPHONES IN ELECTRONIC CONFERENCING SYSTEMS

CROSS REFERENCE TO RELATED APPLICATIONS

The following applications share a common specification, U.S. application Ser. No. 10/859,903 (filed 2 Jun. 2004), U.S. application Ser. No. 10/859,911 (filed 2 Jun. 2004), U.S. application Ser. No. 10/860,602 (filed 2 Jun. 2004), and U.S. application Ser. No. 10/860,604 (filed 2 Jun. 2004).

BACKGROUND

The claimed systems and methods relate generally to electronic conferencing systems that support an audio conversation between local and remote participants, and more particularly to conferencing systems that include several pods that each include a speaker and several microphones, which may be combined to form virtual microphones.

BRIEF SUMMARY

This disclosure describes a virtual microphone for reducing common-mode noise for an individual pod in a multi-pod conferencing system that includes a base and a plurality of pods for local conference participants to communicate with remote conference participants. The described virtual microphone includes pod processor means for providing audio processing for various pod functions and a loudspeaker that couples to a digital to analog converter that converts digital audio to analog audio, where the loudspeaker couples to the pod processor means. In addition, the virtual microphone includes three physical bi-polar microphones positioned at 120-degree intervals in the horizontal resting plane of the pod, wherein each individual physical microphone connects to a pair of audio ports with each audio port being equal distance from the loudspeaker, wherein the physical microphones couple to analog to digital converting means for converting the analog audio to digital audio, and further, wherein the physical microphones couple to the pod processor means. Further, the virtual microphone includes virtual microphone means for combining a plurality of the physical microphones into the virtual microphone. The virtual microphone includes pod echo cancellation means for echo cancellation of sound between the virtual microphone and the loudspeaker. The virtual microphone also includes microphone gating means for determining the best virtual microphone to gate on or off by using a loudness value, a quietness counter, and a noise floor value. The virtual microphone also has the individual pod using the microphone gating means to gate on or off the virtual microphone.

In addition, the described virtual microphone includes a carrier medium that includes a telephone line and includes a base unit including base echo cancellation means for echo cancellation of local audio. The virtual microphone provides that the virtual microphone means further includes providing common-mode noise rejection.

BRIEF DESCRIPTION OF THE DRAWINGS

FIG. 7 shows another exemplary conferencing system having at least two pods and connections between.

FIG. 8 depicts another exemplary conferencing system having four pods and showing connections between the pods and base.

FIG. 9 shows the system in FIG. 8, showing other audio processing components.

Reference will now be made in detail to electronic conferencing systems incorporating pods which may include various aspects, examples of which are illustrated in the accompanying drawings.

DETAILED DESCRIPTION

Conferencing Systems

To facilitate the discussion below, several conference system types depicted in FIGS. 1, 2, 3 and 4 will now be described.

Figure 1:
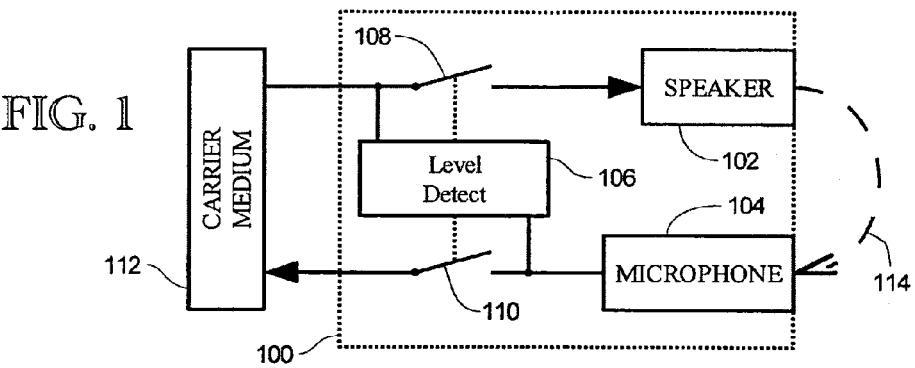
FIG. 1 shows a simple conferencing system utilizing half-duplex communication.

In FIG. 1 aspects of a simplified conferencing device 100 is shown. That conferencing device includes a speaker 102, and a microphone 104, through which a local participant may audibly and conversationally interact with the device. Speaker 102 and microphone 104 are coupled to a carrier medium 112, through which signals of audio content are transmitted and received from a remote participant, not shown. Carrier medium 112 might take any number of forms, in a familiar example a telephone line, or other forms such as electronic, optical or radio communication channels in analog and digital formats. Most recently, digital communication networks are increasingly being utilized over the Internet for conference calls, using recently developed "Voice over IP" (VoIP) protocols. In the below discussion and examples, the particular form of carrier medium is not particularly important, so long as it may carry the audio data between local and remote participants. Thus, even for examples specifically stated to be connectable to telephone lines or other types of mediums, it is contemplated that those examples might be connected to other mediums by making suitable design changes as will be understood by one of ordinary skill in the art.

A conferencing device is different from a common telephone, in that the conferencing device permits a local participant to use the system at an appreciable distance from the device. More specifically, sound from a remote participant is reproduced by a speaker 102 at a level whereby a local participant may understandably listen to the remote sound at some distance from the device, for example several feet. Indeed, the remote sound may be produced at a volume so as to give the impression that the local participant is hearing the remote participant as if he were in the vicinity of the conferencing device, permitting a natural conversation to take place as if the remote participant were present in the room.

Because a local participant's mouth may not be expected to be immediately close to the microphone 104 of the conferencing device, the microphone system may be required to be more sensitive to local sound than a common telephone handset microphone, which might be accomplished by electronic amplification or simply by using a more sensitive microphone. Because sound is produced at a higher level and perhaps because a more sensitive microphone system is utilized, an audio feedback path 114 is introduced. Remote sound is produced by the speaker into the air, which is then received by the microphone. The effect of feedback path 114 is to produce an echo, if the feedback is moderate, which is particularly noticeable by the remote participant. If feedback is also introduced by the remote equipment, a feedback loop is created which may repeat the echo and possibly produce shrill sounds if the feedback is of sufficient gain. In contrast, common telephones do not generally exhibit noticeable echo because the sound produced by the earpiece and received at the microphone is much weaker than the user's voice.

FIG. 1 illustrates a common solution to echo prevention, which is to insert a detector 106 and at least one cutoff switch 108 or 110. In a first exemplary operation, the conferencing device samples the incoming audio from the remote device, and if the audio is sufficiently loud, opens switch 110 (and optionally closes switch 108). Sound is then produced at the speaker, but local audio received at the microphone is not sent to the remote participant. Detector 106 might also sample the audio received at the microphone, for example comparing the level of that sound to the level of the remote sound, allowing a local participant to interrupt a remote participant. In that case, switch 110 is closed and switch 108 is opened. In either case, the feedback path 114 is interrupted, which prevents echo from occurring. It is to be understood that switches 108 and 110 might not be physical switches, if other provisions are available to cut off the carried sound. For example, in a conferencing device utilizing a microprocessor through which digital audio passes, the microprocessor might transmit audio at a zero level, which effectively drops the incoming sound.

Figure 2:
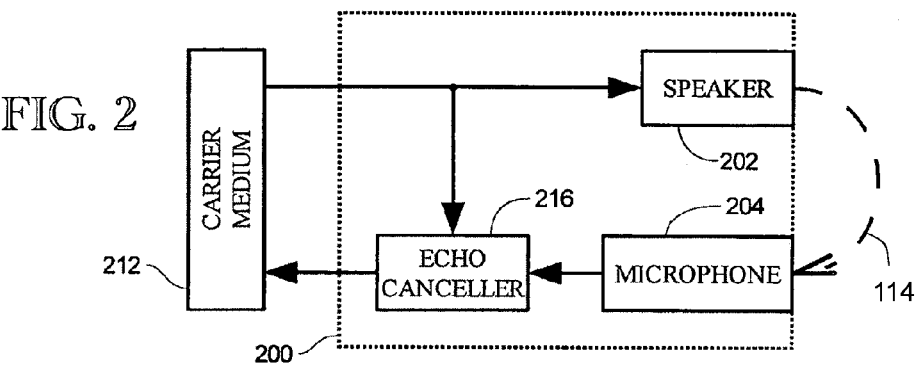
FIG. 2 shows a simple conferencing system utilizing full-duplex communication and echo cancellation.

The example of FIG. 1 describes a conferencing device supporting half-duplexing, which means that one side of a conversation (local or remote) is permitted to proceed at any given time, but not both. FIG. 2 shows a conferencing device 200 supporting full-duplex operation, permitting both local and remote participants to be heard generally during the entire connection. That conferencing device includes a speaker 202 and a microphone 204, and permits audio interaction with a carrier medium 212, as in the example of FIG. 1. Conferencing device 200 includes an echo canceller 216, by which echo is reduced in operation. Speaking in simple terms, echo canceller 216 samples both the incoming remote audio and the audio locally received at the microphone, and subtracts the remote audio from the local audio, producing modified audio. The modified audio, largely stripped of the remote audio, is then sent across carrier medium 212 to remote participants.

For systems that use digital audio, an echo canceller 216 may include a digital filter, the use of which is well known in the digital audio arts. A simple echo cancelling filter might delay the remote audio by a fixed time, scaled by an expected amount of attenuation between the speaker 202 and the microphone 204, and subtract the produced audio from the locally received audio from the microphone. Such an implementation may effectively reduce echo to acceptable levels, particularly where the surroundings where the conferencing device is to be used are stable and well-understood. If surroundings are indeterminate, or if portability is needed, a dynamic filter may provide enhanced echo cancellation.

A dynamic filter is one that is tuned as the conference is taking place, which might use initial values set by design or set from a prior conference. As a conference proceeds, the conference device analyzes the performance of the filter, evaluating the outgoing audio for echo artifacts or reflections. If echo is noticed in the output, the filter is re-tuned, with the object of reducing the echo to an acceptable level. This operation may be helpful to cancel echo under circumstances where reflections may change (such as if people or reflecting objects relocate or reorient) or if microphones are moved during a conference.

Complex filters may also be used, which incorporate multiple delays and scaling factors for reducing echo. Under many circumstances, remote sound received at a microphone will be from reflections from multiple objects and surfaces, which results in the echo being received at multiple delays and degrees of attenuation. In those circumstances, a filter including only a single delay may not effectively cancel all the echo. If desired, and if sufficient computation and memory resources are available, a filter can be constructed with one constant (scaler) per sample over a fixed interval, which can effectively eliminate all echo, assuming that the constants can be appropriately set during a conference.

An additional technique is to utilize two microphones (or several microphones) placed in selective different directions and/or locations, so as to provide cancellation for the sound produced at a speaker. At least one example of this technique will be discussed below. Now this technique does not generally provide a complete solution, as the reflection conditions are difficult to hold fixed. It may, however, improve the worst-case echo performance of a conferencing system.

Figure 3:
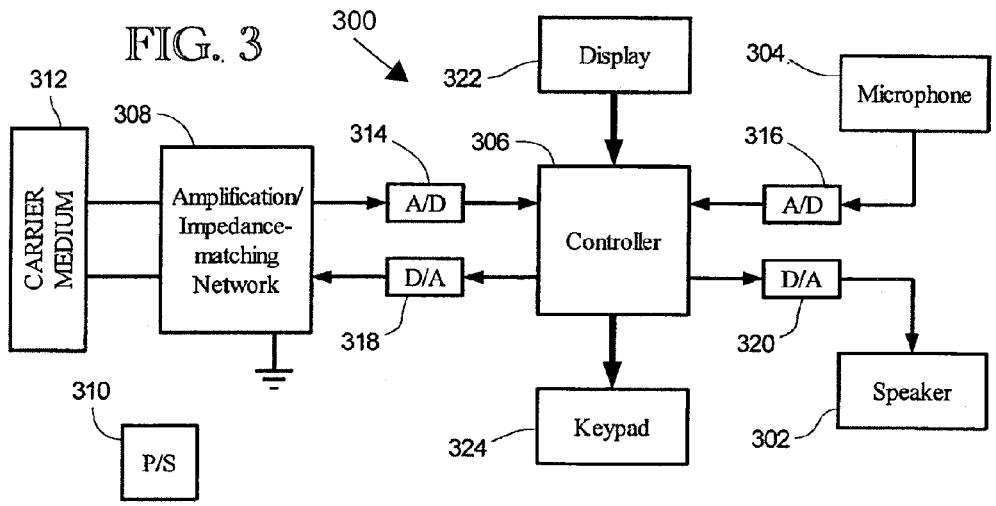
FIG. 3 shows a simplified conferencing system utilizing contemporary components.

In FIG. 3 a conferencing device 300 is depicted including contemporary components. Conferencing device 300 includes again a speaker 302, a microphone 304, and couples to a carrier medium 312. A controller 306 provides processing power to the conferencing device 300, and control interfaces and functions for a display 322 and a keypad 324. A power supply 310 provides electrical power to the various device electronic components. Many contemporary designs process audio data in digital format, the data existing as a continuous stream of numeric values representing the waveform of the original sound taken at a defined frequency, for example 8 kHz. By processing data in digital format, intermediate circuit noise is avoided and the number of electronic parts can be reduced. Additionally, by reducing the number of parts, the failure rate of a production run of electronic devices can be significantly reduced which leads to better economy for the producer and seller, and also better reliability for an end-user.

Conferencing device 300 utilizes such a digital design. Speaker 302 is driven by controller 306 by way of a digital-to-analog (D/A) converter 320 and amplification circuits, not shown. Microphone 304 is sampled by an analog-to-digital (A/D) converter 316 by which a stream of incoming audio data is supplied to controller 306. In like fashion, analog audio data carried over carrier medium 312 is converted to and from a digital format by converters 314 and 318. The signals carried on carrier medium 312 may best be read in an amplified state, as those signals may be small-signal in nature. An amplification and impedance matching network 308 may be included to match the signals on carrier medium 312 to processable and producible signals at converters 314 and 318. For example, carrier medium might carry an unmodulated analog audio signal peaking at about 100 mV. A/D converter 314 might accept an input from 0-5.0 volts. In that case, network 308 might include a circuit to amplify the audio signal to amplitude peaks of 2.5 volts and shift the voltage to center at a 2.5V offset. Network 308 might also include a loading element to balance the impedance of carrier medium 312, for example a 50 ohm resistive load. The output of D/A converter 318 might be reduced and offset or isolated to match the voltage characteristics of the medium 312. Furthermore, if carrier medium 312 were low-impedance in nature, network 308 might include an impedance matching amplifier for the outgoing signal. Network 308 might further include isolation transformers to protect against DC offsets on the carrier medium. Likewise, if carrier medium 312 were digital in nature, converters 314 and 318 and network 308 could be replaced with a transceiver suitable for the particular medium.

Figure 4A:
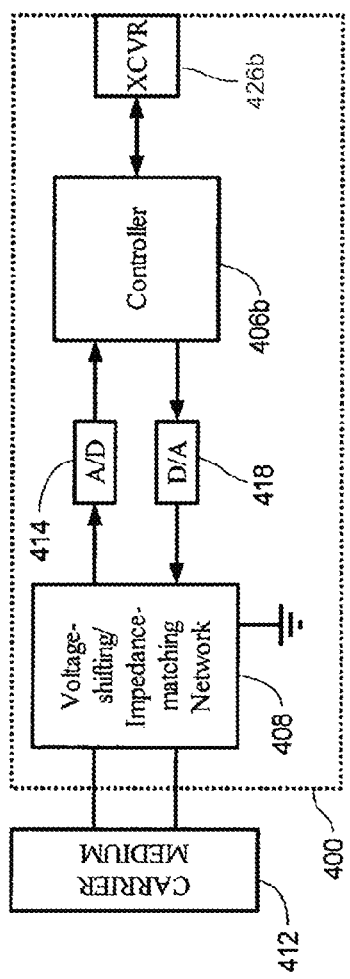
FIGS. 4A and 4B shows another simplified conferencing system divided into a base (4A) and pod (4B) portion.
Figure 4B:
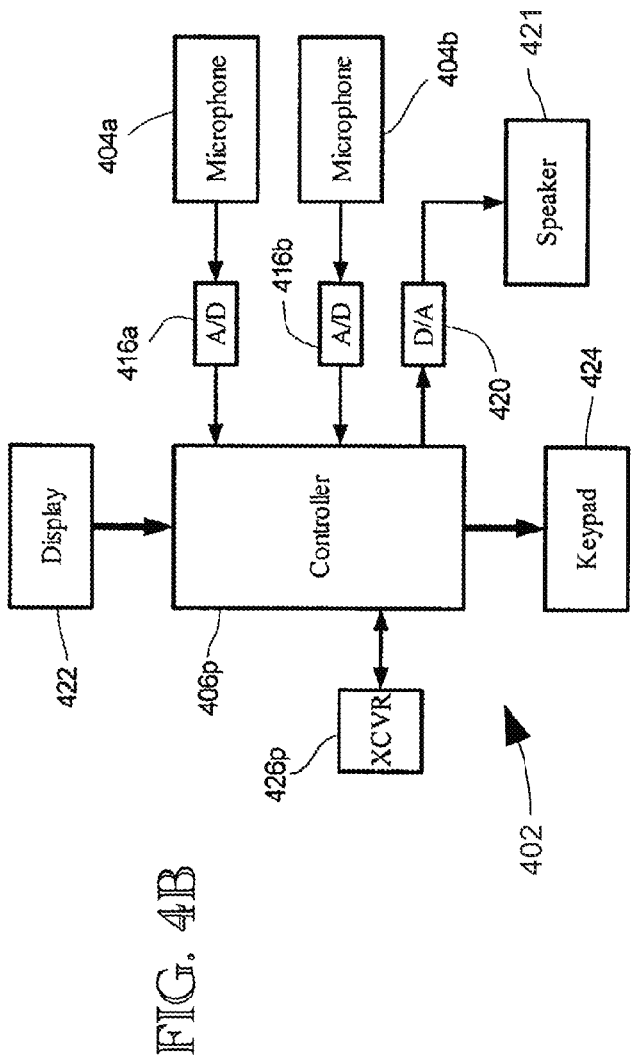

In FIGS. 4A and 4B a related conferencing system is depicted, but this system is divided into a base 400 (FIG. 4A) and a pod 402 (FIG. 4B), which may reduce the aspect of the portion of the system in relative proximity to local conference participants. The base 400 includes an amplifying/impedance matching network 408 connectible to a carrier medium 412. Base further includes converters 414 and 418 and a base controller 406b performing similar functions as in the example of FIG. 3. Display 422 and keypad 424 are moved to pod 402, which is controlled by a pod controller 406p. Pod 402 includes two microphones, 404a and 404b, converted to digital data by A/D converters 416a and 416b. A speaker 421 is also provided and driven by way of an amplifier and a D/A converter 420. Controllers 406b and 406p may communicate by way of transceivers 426b and 426p. Those transceivers establish a communications channel carrying at least audio data between base 400 and pod 402, and may further carry control signals such as on/off hook, DTMF tones, and other signals. Transceivers 426b and 426p might operate over a cabled medium, such as copper wire or optical fibers, or over a non-cabled medium such as a radio or even an infra-red channel.

As will be shown in further examples, pods may contain several microphones to provide for better range of pickup. A pod might also include several speakers, for example a high frequency and low frequency speaker or speakers mounted in different orientations.

A conferencing system may also connect to more than one connection medium, for example two telephone lines. A conferencing system may also be fashioned to connect to multiple medium types, such as a system having provisions for a telephone line connection or a VoIP utilizing an Ethernet connection.

Example Conferencing System 1

Figure 5:
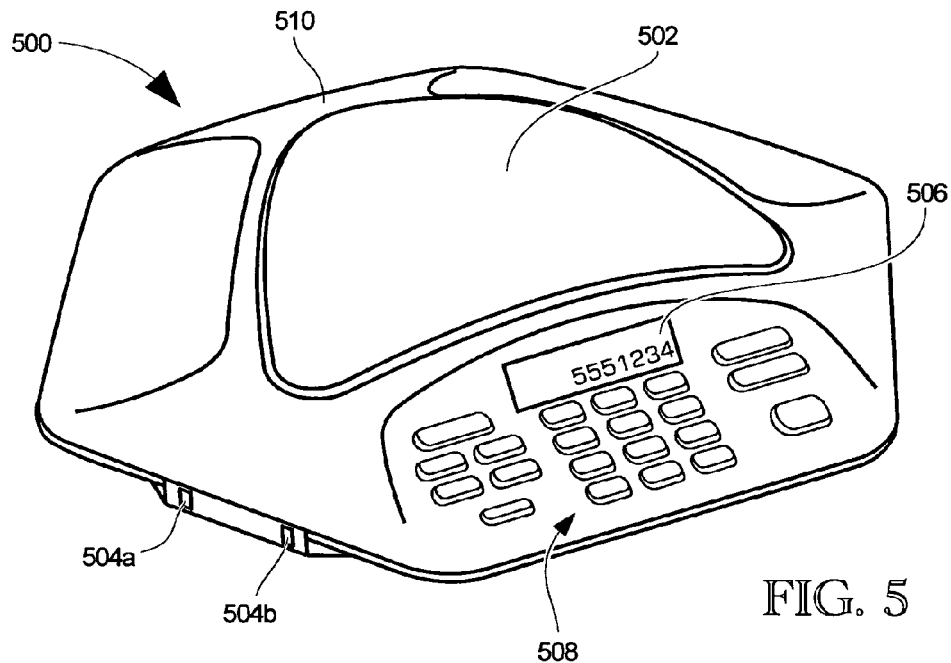
FIG. 5 depicts a form factor of an exemplary conferencing system pod.

Depicted in FIG. 5 is an exemplary conferencing pod 500 having a contemporary form factor, which will provide context for several features described below. It is to be understood that the features later described are applicable to other conferencing devices having various configurations differing from the example described for FIG. 5, and generally do not require any particular configuration. Exemplary conferencing pod 500 includes a housing 510 having a flat bottom, not shown, where on the device may rest on a table or other flat surface. Pod 500 includes a speaker 502 and optionally a speaker grill, located substantially in the center of the top of the device whereby produced audio may be projected into a room with wide dispersion. Three bi-polar microphones are positioned at 120-degree intervals in the horizontal resting plane of pod 500 substantially around the speaker, providing substantially 360-degree coverage in that plane. Pod 500 further includes a display 506, which provides visual indicators of the operational status of the device. A keypad 508 is also included providing command input to pod 500, and may provide digit keys, an on/off hook key, setup keys, volume and mute keys, and other keys as desired.

Each bi-polar microphone is located within the protective environment of the housing 510, wherein a pair of audio ports is included, one pair being visible in the FIG. as audio ports 504a and 504b. These audio ports may be placed near the expected tabletop surface, as in the example of FIG. 5, to receive sound reflected off that surface. Passages from ports 504a and 504b, not shown, to their respective microphones are isolated from other passages to prevent cross-mixing of sound entering at the respective ports. Each port of a pair is placed at a substantially equal distance from the speaker 502, and likewise each microphone passage of a pair is maintained at a substantially equal length, so as to provide an audio path from speaker 502 to each microphone of a pair. Because sound must travel an equal distance to each microphone of a bi-polar pair, sound from the speaker arriving at one microphone will be in-phase with the sound arriving at the other microphone. The output of one microphone of a bi-polar pair is inverted, providing for cancellation of some of the sound produced by speaker 502 when the two microphones in the pair are summed together. This inversion may be performed numerically by an included processor, by an inverting amplifier, or by many other configurations.

As exemplary pod 500 provides substantially 360-degree coverage in the horizontal plane, it is suitable for placement at the center of a conference table or within a group of local conference participants. Other configurations may also be provided providing varying coverage, for example a device having 180 coverage intended to be placed on a table against a wall.

Additionally, a conferencing device need not have exactly three microphones. A device with two microphones placed on opposing sides may provide adequate coverage, if microphones having a wide sensitivity pattern are used. Likewise, four or more microphones might be used surrounding a device, providing better selectivity of sound from a participant, although at additional cost. Microphones placed at varying distances might also be useful, or microphones of various sensitivities, for example, if it is desired to locate the device closer to the end of a table. Furthermore, a conferencing device need not include bi-polar microphones, provided that the device includes countermeasures to reduce any unacceptable echo, particularly if full-duplex operation is desired.

Figure 6:
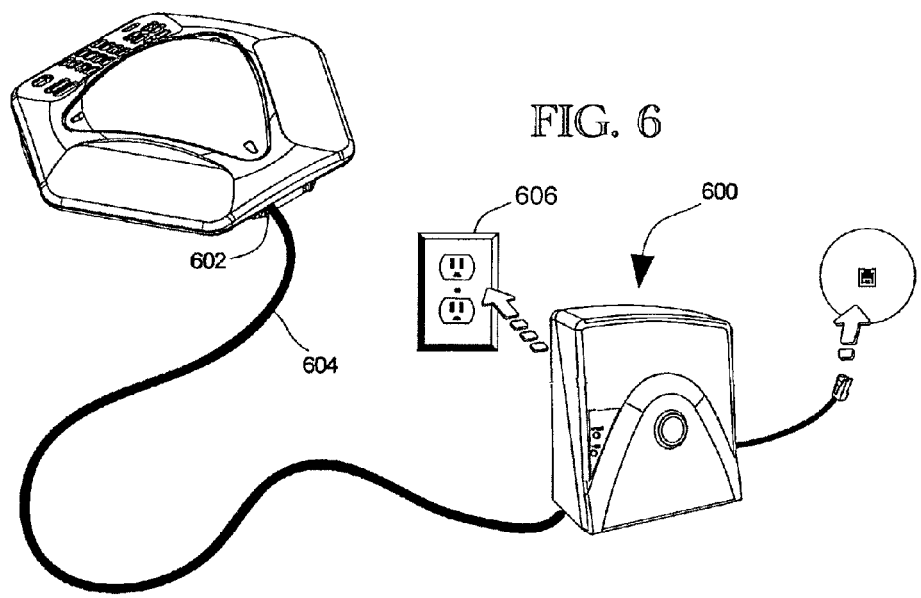
FIG. 6 shows an exemplary conferencing system including one pod in operational connective configuration.

Referring now to FIG. 6, the exemplary pod 500 is made operational by connection to a base 600 by way of a cable 604 and receptacle 602 located in pod 500. In this example, cable 604 is a category 5 networking type cable, the connections and signals carried described below. Cable 604 might be about 25 feet in length, to provide for the relatively distant placement of pod 500 from base 600, which might allow placement of the base 600 near a wall or other unobtrusive location and pod 500 on a table. Of course, cable 604 might be made to many lengths, even customized by an installer. Base 600 includes a cable and connector to supply to main power from a receptacle 606, and a means of connecting to a carrying medium, in this example a telephone cable having an RJ-11 connector for connection to a standard telephone line. Base 600 may also include indicator lights to show to a user the operational status of the base unit or the conferencing system.

Figure 7:
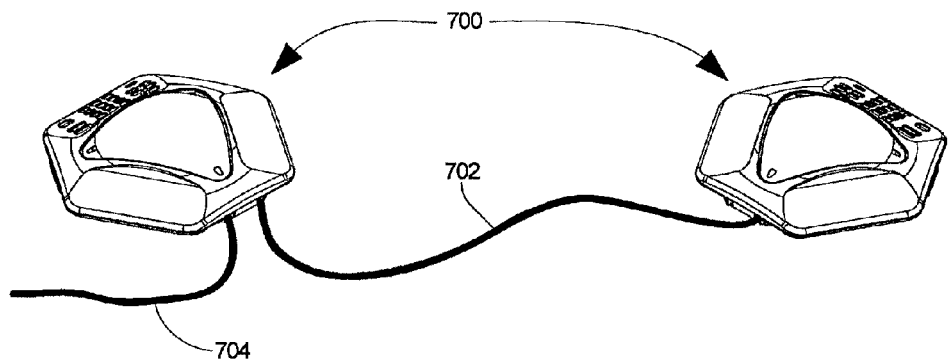

Now, some of the examples described herein include multiple pods, one exemplary configuration shown in FIG. 7. In this example, two pods 700, each including two data link connections, are connected in daisy-chained fashion to a base unit. A cable 702, in this case being a 12 foot length of category 5 type cable, connects the two pods together. Another cable 704, again a 25 foot length of category 5 type cable, connects one of the pods 700 to a base unit, not shown. Other examples of multiple-pod systems will be described below.

Figure 10:
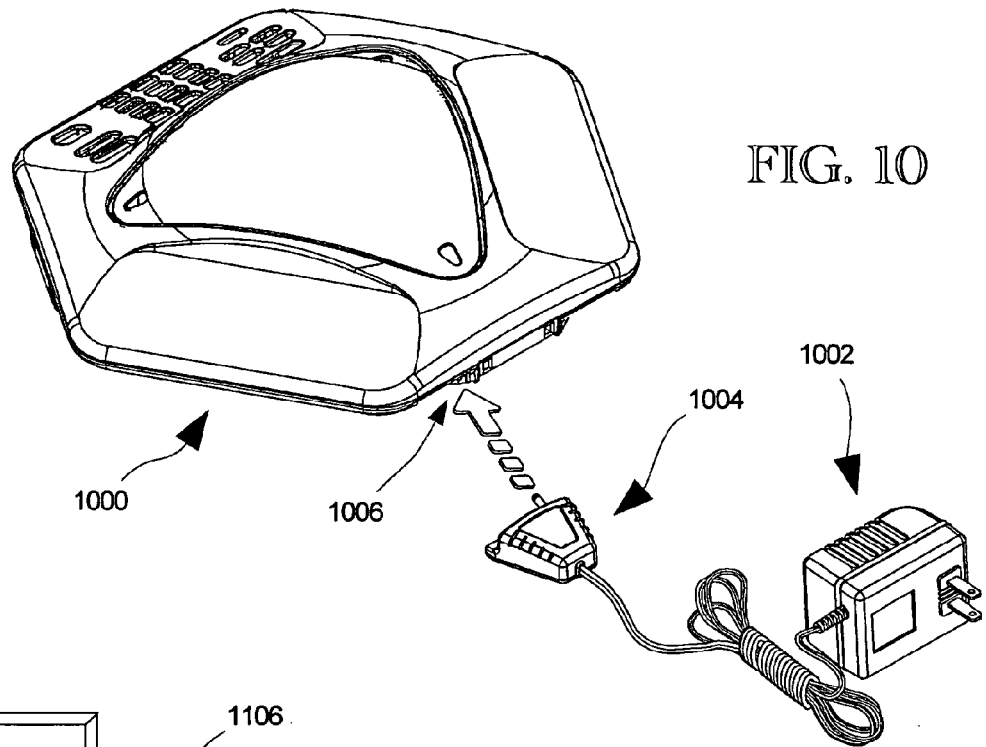
FIG. 10 depicts an exemplary conferencing pod utilizing an RF wireless connection to a base and an external power supply.

In a related exemplary system shown in FIG. 10, the data connection between the pod and the base is wireless, conforming to Digital Enhanced Cordless Telecommunications (DECT) or Worldwide Digital Cordless Telecommunications (WDCT) standards, depending on the country of intended use. In that system, a pod 1000 is provided with an external power supply 1002, connected by connections 1004 and 1006. Power supply 1002 connects to mains power and is provided with a cord sufficiently long for expected installation configurations.

Figure 11:
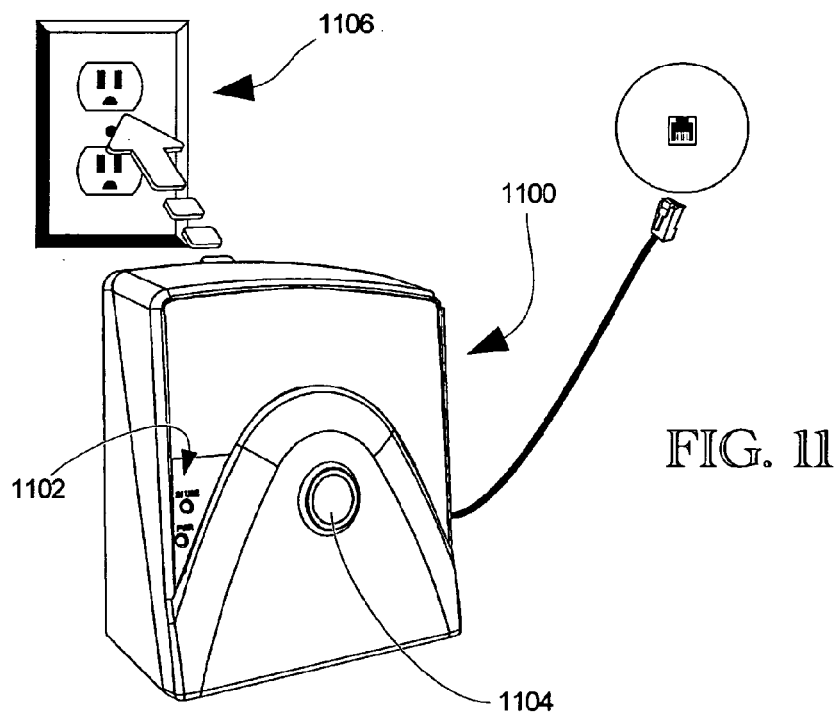
FIG. 11 shows the base unit corresponding to the wireless pod of FIG. 10.

Shown in FIG. 11 is the base unit 1100 of that exemplary wireless system. That base unit includes means of connecting to a receptacle of main power 1106. This example further includes optional indicator lights 1102, and a paging button 1104 which causes base 1100 to send a paging command to pods, by which the pods may emit an audible signal assisting a person in locating a lost or misplaced pod.

Figure 12:
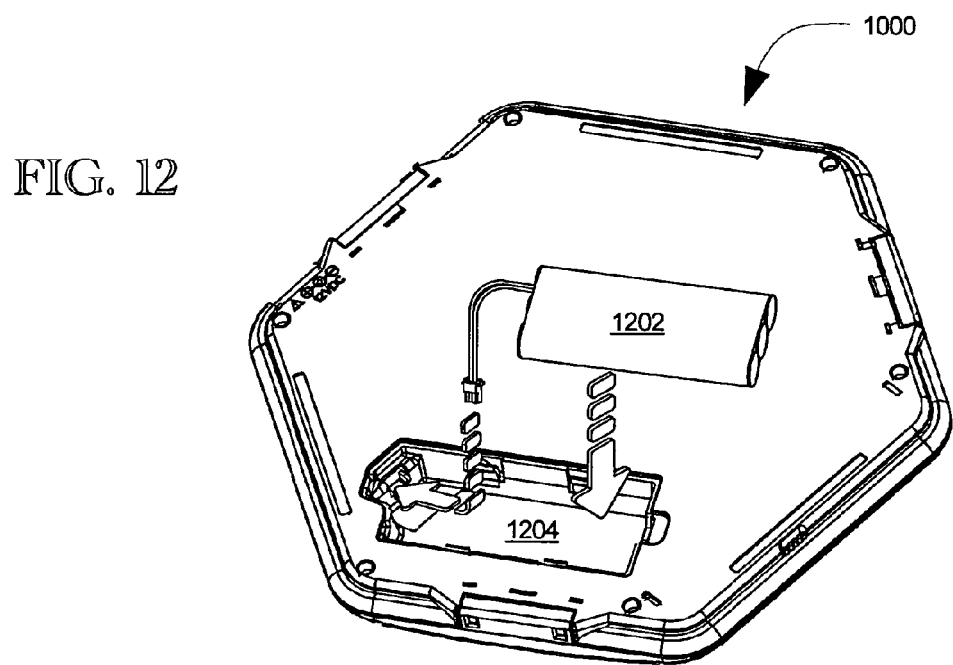
FIG. 12 illustrates the installation of a battery into the exemplary pod of FIG. 10.

The exemplary pod 1000 of FIG. 10 further includes a rechargeable battery 1202, the installation of which is depicted in FIG. 12 to a cavity 1204 in the housing of pod 1000. Exemplary pod 1000 may operate from either of external power supply 1002 or battery 1202. Exemplary pod 1000 provides a recharging circuit for an installed battery 1202, so that the battery may be recharged when power supply 1002 is connected. The battery 1202 may be of sufficient capacity to operate for extended periods of time, for example 8 hours of talk time or 2 days of standby. A wireless pod might also be fashioned to use non-rechargeable batteries, such as alkaline types, for which a pod might include a switch for selecting an installed battery type, or may omit the battery charger altogether.

The exemplary conference system of FIGS. 10, 11 and 12 utilizes spread spectrum techniques to spread the communications link between the pod and the base between several frequencies, for example 75 or 120 channels. The system further utilizes a pseudo-random number generator to select a sequence in which channels are to be used. The system may also provide a blacklist of channels that are known to have interference, and skip or select alternate channels if a blacklisted channel is pseudo-randomly picked. The use of spread spectrum and pseudo-random selection provides a degree of interference immunity and security from unintended listeners. The system further includes radio transceivers sufficient to communicate over a selected distance, which, for example, might be defined to be 150 feet in free air or perhaps 50 feet with two walls of standard construction between the pod and base.

Example Conferencing System 2

Figure 15:
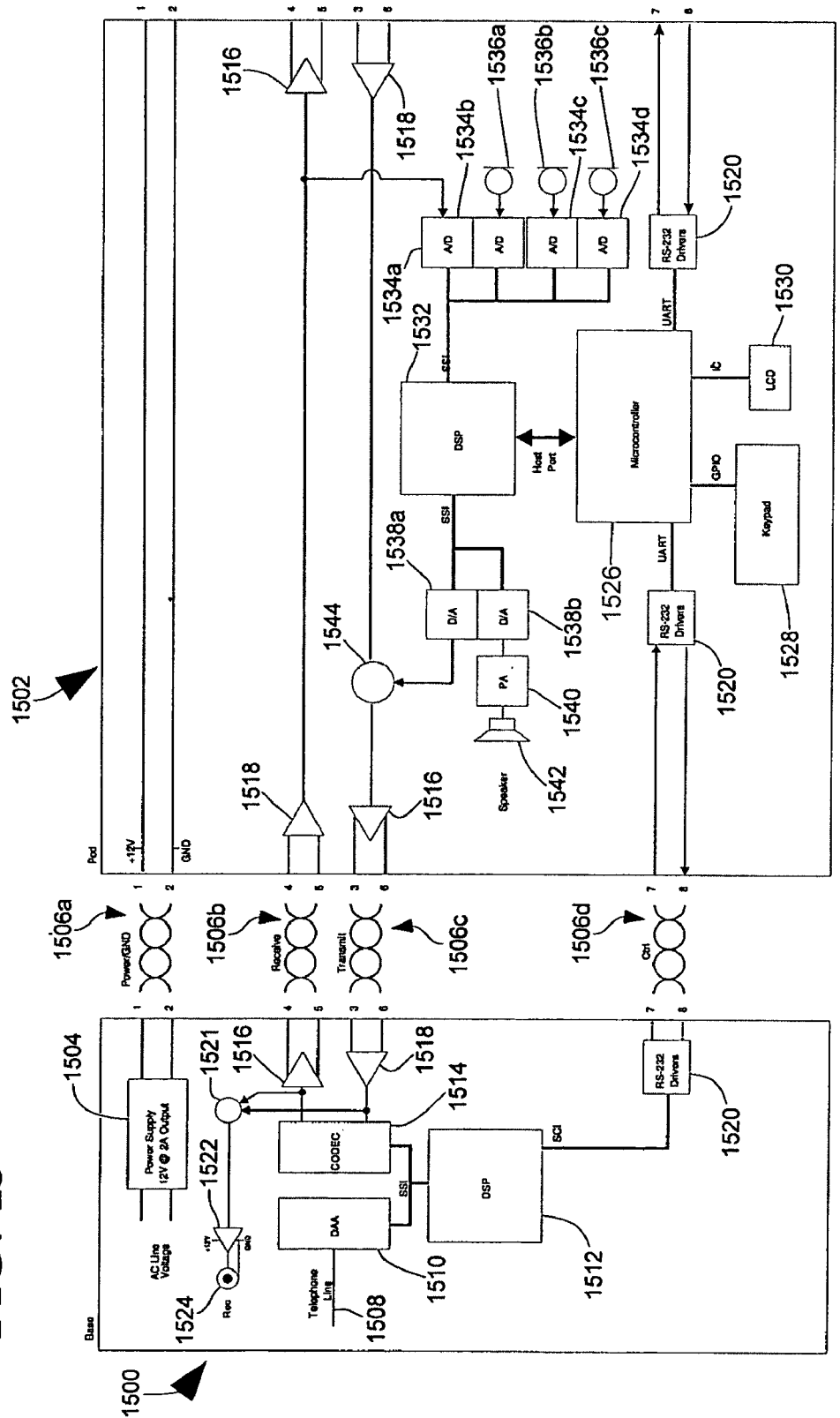
FIG. 15 shows components of an exemplary multiple-pod conferencing system.

FIG. 15 depicts at a moderate level various components of a system that may support multiple pods utilizing a single telephone line, that system including echo cancellation for pods generally as a system and also supporting full-duplex operation. That system includes a base 1500 and up to four pods 1502, connectible through cables fashioned from category 5 type cable. Category 5 type cable consists of four twisted 24 AWG copper wire pairs 1506a-d. Other types of cables may also be used, for example a similar cable having 28 AWG wire, provided that consideration is given to the types of signals and currents that will be carried. Base 1500 includes a power supply 1504 accepting a main supply input and providing, in this example, 12VDC at 2 A for power to both the base and pods through one twisted pair 1506a. Base 1500 further includes a connector for connecting to, in this example, a telephone line 1508. Base 1500 further includes a digital/analog adapter 1510 (DAA) to convert the analog telephonic signals to and from the digital domain usable by digital signal processor 1512. Further included in DAA 1510 is a coupler/decoupler to the telephone line to connect and disconnect the system. Those of ordinary skill in the art will recognize that mediums other than standard telephone lines can be utilized by adapting component 1510 suitably. For example, in a VoIP application an encoder and Ethernet/IP transceiver might be appropriate.

Telephone line audio is separated by a codec 1514 with the assistance of DSP 1512 into incoming and outgoing streams. The audio signal may be referenced to ground while transiting through the base 1500 or a pod 1502, but is communicated differentially across intermediate cables in twisted pairs 1506b and 1506c providing immunity to electronically-induced noise. Single-ended to differential transceivers 1516 and differential to single-ended transceivers 1518 are provided to make the conversion at the cable interfaces. The remaining twisted pair 1506d is utilized as a "control" channel for communicating commands and data other than analog audio through the system between the base and the first pod or between pods. In this exemplary system, data is communicated in full duplex at RS-232 voltages utilizing RS-232 drivers 1520 at about 57,600 baud.

Base DSP 1512 provides control and computation facilities for the various base functions, one of which may be echo cancellation as described above. Although component 1512 is labeled a DSP, a general purpose processor or other processor might be used provided that sufficient processing power is provided to perform the desired functions. A recording facility may also be included if desired, in this example through a summer 1521, an amplifier 1522 and a connector jack 1524 for connection of a recording device.

Pod 1502 includes a processor 1526, in this case a microcontroller, which provides communication and interpretation facilities for the data and/or commands passing over the control channel, utilizing other components as shown. Processor 1526 includes interfaces to a keypad 1528 and a liquid crystal display (LCD) 1530, also included in pod 1502. A separate processor 1532, in this example a DSP56F826 DSP processor, available from MOTOROLA®, Inc. of Schaumburg, Ill., is included to handle audio functions independently from processor 1526. This implementation containing two separate processors is merely exemplary; one more powerful processor or alternatively a number of smaller, but distributed processors could be used to accomplish the audio and control functions of the pod.

Pod 1502 includes several sampling devices 1534a-1534d, which are used to sample the incoming audio stream and three microphones 1536a-1536c. Two digital to analog devices 1538a and 1538b are included to supply analog audio signals to the outgoing audio stream through a summing device 1544 and to a speaker 1542 by way of a power amplifier 1540. Summing device 1544 need not be elaborate: for example summing device might be a summing operational amplifier or even a simple transformer coupling the output of digital to analog device 1538a to the outgoing audio line. In this method, each pod makes a contribution to the audio output creating a summing bus starting at the last pod in the chain and ending in the base receiver.

It will be recognized that the current carrying capacity of a category five pair is approximately 2 A; therefore if a system is to be fashioned with many pods it may be necessary to either utilize a different cabling scheme, reduce the power consumed or to provide a supplemental power source.

Referring now to FIG. 8, an exemplary conferencing system including a base and four connections is shown conceptually in operationally connected form. A base 800 again connects to mains power, and also to a telephone line through a telephone cord 804. Base 800 connects to a first pod 802a through a category 5 cable 806a as described above. Each of successive pods 802b-802d is connected in daisy-chain fashion through cables 806b-806d.

FIG. 9 shows the elements of FIG. 8, wherein each pod is shown symbolically having three microphones, a loudspeaker, and a processing and user interface. For the discussion below, data and audio traveling in the "downstream" direction is data traveling toward the pod at the end of the daisy chain, and "upstream" data is data traveling toward the base.

Figure 13:
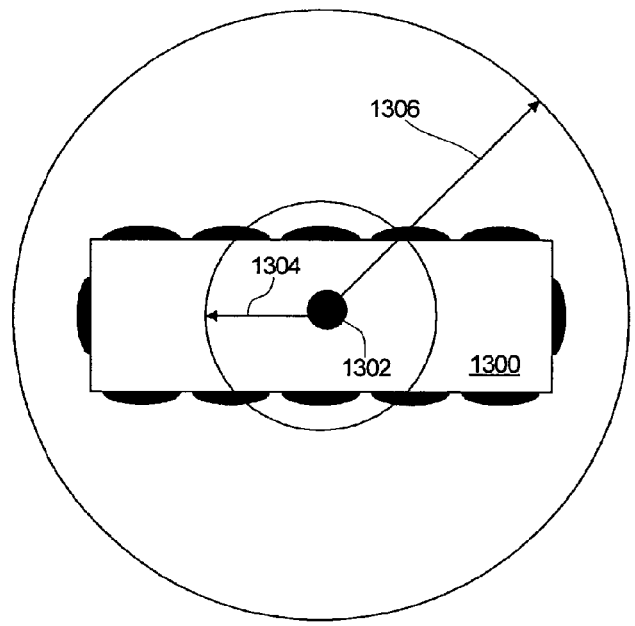
FIG. 13 displays zones of usability for an exemplary single-pod configuration.

FIG. 13 depicts exemplary theoretical zones of usability, which may be applied to the design of a pod as described above. Pictured in FIG. 13 is a conference table 1300, as viewed from above, which is 12 feet long by 4 feet wide. Placed at the center of the table is a pod 1302, which may be of the type described above. An optimal pickup radius 1304 provides best performance, which may mean good echo cancellation and good signal-to-noise ratio, when a participant located near the circle defined by radius 1304 is speaking normally. A maximal pickup radius 1306 provides a maximal distance of a participant from the pod to be heard with acceptable signal-to-noise and echo cancellation. In one example, radius 1304 is about three feet and radius 1306 is about eight feet. A pod might be designed to receive speech at other distances, but it should be kept in mind that a tradeoff between sensitivity and noise may limit the possible distances that may work best. For example, if a greater pickup radius were designed into the system, it might pickup other nuisance noises in the room, such as air ducts and squeaks from nearby chairs.

Figure 14:
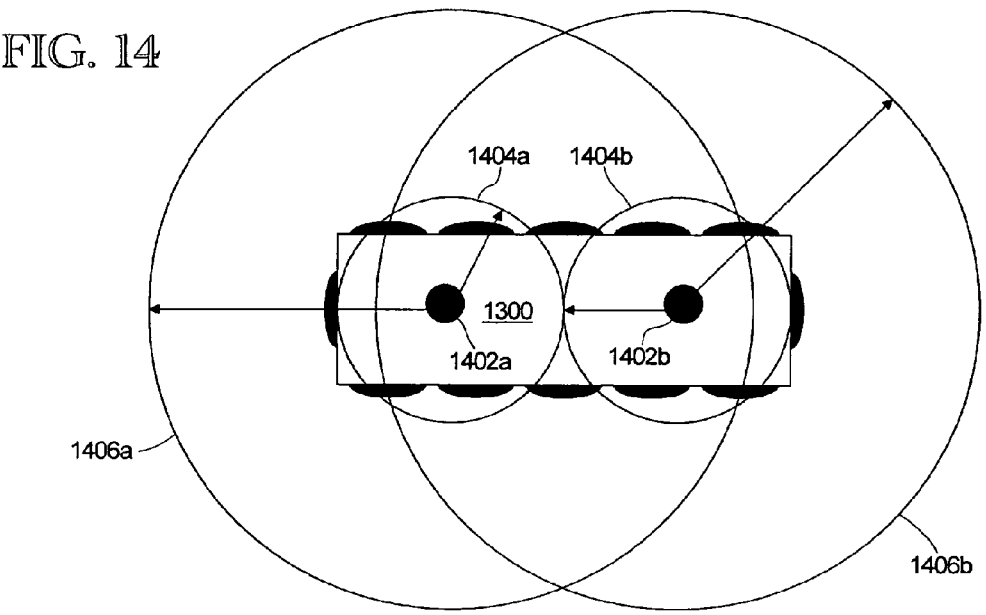
FIG. 14 displays zones of usability for an exemplary dual-pod configuration.

Depicted in FIG. 14 is a conference system including two pods 1402a and 1402b, having the same characteristics as the pod 1302 of FIG. 13, and located away from the center and toward the ends of conference table 1300 about six feet apart. In this example, nearly the entire conference table is within the zones of optimal performance 1404a and 1404b. In addition, a much greater area of the room falls within the acceptable performance zones 1406a and 1406b. Furthermore, the system can take advantage of additional microphones near the participants, selecting the best pod and/or microphones for speech from participants, one such selection method being described below.

Still referring to FIG. 14, each of pods 1402a and 1402b includes a loudspeaker. By utilizing both loudspeakers, a better sound distribution is achieved at the table and in the room. As in a system described below, the volume level of both pods may be adjusted in tandem, and loud and soft spots in the room may thereby be avoided.

Including additional pods can yield certain advantages over other systems intended to improve the interactivity of local participants relatively far away from a pod. In a first alternative system, additional microphones are added near the distant participants to provide better pickup. This system may exhibit poor performance in two ways. First, the distant participants may not be able to hear the remote side of the conversation without turning the volume up at the pod, which can make the sound too loud to be comfortable for participants nearby the pod. Second, people naturally tend to talk toward the source of the remote conversation. This leads distant participants to talk toward the pod, rather than into an added microphone.

In a second alternative system, the audio from a pod is replaced with audio from an external speaker, mounted in a relatively remote location such as high on a wall or ceiling. The external speaker is driven at a volume sufficient to disperse the remote side of the conversation throughout the room. Now although this system may solve the problem of providing the remote side of the conversation to all participants at comfortable levels, it tends to exacerbate the problem of local participants speaking toward the source of the remote conversation (the remote speaker high on the wall) rather than provided microphones at tabletop level. Good microphone pickup may therefore be a problem in these alternative systems.

Although these alternative systems may be acceptable under some circumstances, the generalized performance may not be as optimal as using multiple pods at tabletop level. Sound is more evenly distributed to local participants through multiple speakers, one at each pod. With more even distribution of sound, lower volume levels may be utilized without adversely affecting listenability. Additionally, a local participant may speak toward the source of the remote side of the conversation, and as the microphones are located nearby the speaker in the pod, local participants will naturally and properly direct their speech to the microphones. Furthermore, because microphones are provided in each of several multiple pods, the necessity of additional microphones may be avoided or even eliminated.

The benefits of multiple pods may be extended by providing other pods in the system, by which longer or larger conference tables may be used with a conferencing system.

Distributed Microphone Gating

In conferencing systems with more than one microphone, the microphones may be gated on and off to match the local participant activity. Thus, when a participant begins speaking, the microphone best picking up his speech should turn on, while others not receiving substantial sound remain silent or attenuated. Likewise, if two people are speaking at different microphones, both microphones may turn on. Although the automatic selection of microphones in a system may utilize any number of selection methods, one method is described below particularly applicable to a multi-pod conference system.

In designing the exemplary gating method described below, two goals were kept in mind. The first was, of course, to select the best microphones to match the participant's speech. The second goal was to maintain a relatively constant gain (i.e., sound injection onto the outgoing signal) at all times. By maintaining a constant gain, several advantages may be realized. The noise level can be held relatively constant by maintaining a constant sound injection into the outgoing audio channel. This reduces the "pumping" of noise at the remote participant's site from microphones switching on and off from participants intermittently speaking and going silent. Additionally, echo cancellation may be simplified as the feedback from the system speakers to microphones is held relatively constant. Although these features or goals may be desirable under certain circumstances, it is not necessary to achieve those to produce a usable conference system. Similar systems that do not maintain a constant gain or select microphones immediately close to speaking participants may therefore be adequate under some circumstances.

A conferencing system may assume certain "normal" conditions to provide for good performance under usual circumstances. A first condition is that usually at most one local participant will be speaking at any given time, with relatively short periods where local participants may be speaking "over" each other. Utilizing that assumption, it is reasonable in a pod having several microphones to select the microphone having the best signal-to-noise ratio, or in a multi-pod system to select the pod best picking up a participant's speech. For cases of several participants speaking over one another, it will likely be the case that all of the participants' sound will be picked up by a microphone selected for a first speaking participant. That fact may be relied upon to give a remote participant an indication that two local participants are speaking over each other, even though only a limited number of microphones are selected. If a second assumption is made that the noise is fairly constant across all the microphones of a system, the best microphone may become simply the microphone receiving the loudest sound at any given time. A third assumption may also be made that once a participant begins to speak to a pod, he will continue speaking to that pod at least until he is finished. Using this assumption, it may be practical to hold a microphone gated on, even if another microphone picks up slightly more sound. By utilizing such a principle, sudden volume drops or increases can be avoided during a participant's speaking, perhaps even if he turns his head in a different direction before he finishes. The play of these assumptions in the described method will become more apparent in the discussion below.

In the exemplary gating method each pod gates on no more than one microphone in the pod at any given time, with the understanding that a microphone might be any one of several available inputs, including unitary microphones, bi-polar microphones as described above and below, or even virtual microphones, an example of which is also described below. The pod is permitted to switch to gating a different pod microphone if circumstances warrant (i.e., if the volume substantially increases at the second microphone). For the purposes of this discussion, if a microphone of a pod is gated on, the pod will be considered to be gated on.

In the exemplary gating method, more than one pod is permitted to be gated on, which can be helpful to pick up two or more speakers located near different pods. Also in the method, at least one pod is kept gated on during a conference, which has the effect of transmitting to remote participants the ambient noise in the room, by which the remote participants may have a continuing indication that the conference is live. The method gravitates, however, to keeping no more than one pod gated, which tends to limit the noise and gain received at the remote side.

For microphones gated off, the method defines "off" to be attenuated by approximately −12 dB rather than totally muting the microphone input. More attenuation may lead to "pumping" of noise, by which a person on the other size may hear the noise level fluctuate between when a participant is speaking and not speaking, which can be a nuisance. Additionally, to maintain a more constant gain and perceived noise floor in the system, if more than one microphone is gated on then attenuation is applied to each gated microphone using the equation attenuation=sqrt(1/n) where n is the number of open microphones.

Turning now to FIGS. 18, 19*a*, 19*b* and 20, the exemplary method is shown in flowchart format, that method being performed at each pod in a multiple-pod system. The method defines a loop beginning at 1800, which proceeds at a specified interval, which is generally the interval of gating information communication between pods. In step 1802, an internal loudness value is computed. In the exemplary method the loudness value, or loudness meter, receives the input of one or more microphones, rectifies the input, and resets the loudness value to any higher input values. The loudness value is permitted to decay at a rate of 250 dB/sec, in order to indicate low loudness during relatively long quiet periods. An additional zero correction offset may be applied, for example, if the microphone input is not centered about zero. The zero offset correction might be calculated as the average input over some given time, or another method as will be understood by one of ordinary skill. Although the loudness value might be designed to reflect the loudness of all present microphones collectively, it may be desirable to maintain a loudness value for each microphone, which may be useful data in selecting the best microphone of a pod to gate on. In that case, the loudness value of a pod might be designed to be the maximum of the individual microphone loudness values.

Execution of the method then proceeds at step 1806, in which a determination is made as to whether or not the pod executing the method is the last in the chain of multiple pods. This is important to compute the loudness value sent upstream to an adjacent pod, as the value sent upstream is the maximum of this pod and all other pods downstream. If the pod is last in the chain, the upstream loudness is merely the internal loudness of the pod, as reflected in step 1808. Otherwise, the method pauses in step 1810 to receive an upstream loudness from the downstream pod. Upon receipt, a new upstream loudness is computed in step 1812 to be the maximum of the received loudness from the downstream pod and the internal loudness computed in step 1802. Once the upstream loudness is determined, a new packet containing the upstream loudness is sent upstream in step 1814 to the adjacent pod (or to the base if this pod is first in the chain.) Steps 1816, 1818, 1820, 1822, and 1824 reflect a similar procedure for calculating and sending a new downstream loudness. Following the transmission or reception of the upstream and downstream loudness, the gating computation may proceed in step 1804 as described in FIGS. 19*a* and 19*b*.

Figure 18:
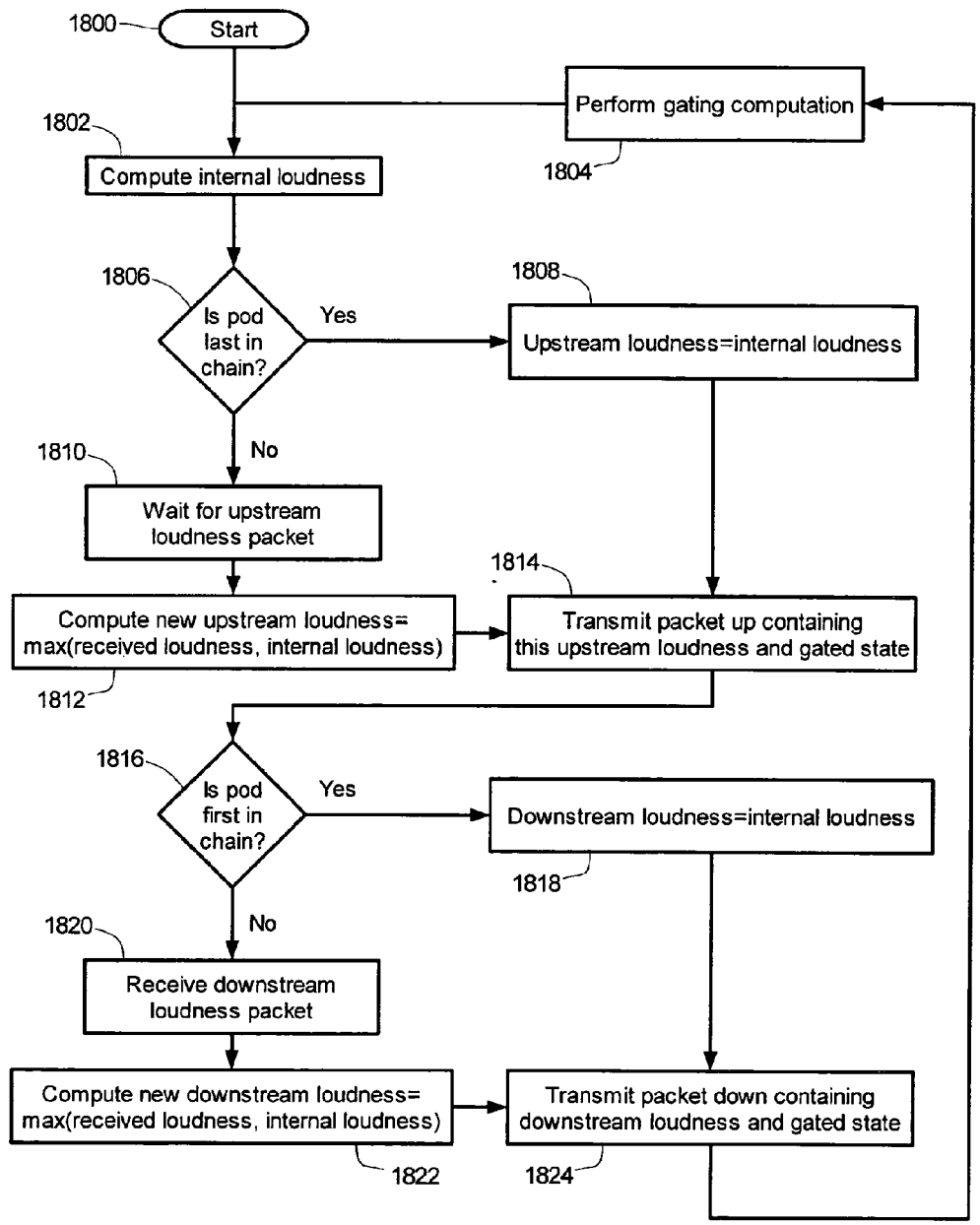
FIG. 18 shows an exemplary method of sharing microphone gating information between pods.

The method shown in FIG. 18 is merely one exemplary method for passing loudness information through a multiple-pod conference system. Many other methods can be fashioned to serve a similar purpose, as will be understood by one of ordinary skill. The example of FIG. 18 was chosen as an example of easy understanding, utilizing a synchronous mode of operation. An alternative asynchronous mode, for example, would not wait for an upstream or downstream loudness packet, as in steps 1810 and 1820, but would rather use the latest received upstream or downstream loudness value regardless of how fresh that value was. In yet another example, steps 1806 and 1820 are omitted, and the system retains a shadow upstream and downstream loudness value reset to zero. For pods located at the front or rear of a chain, the upstream or downstream loudness will always be zero, and thus the internal loudness would always be used in the direction where no adjacent pod exists.

Figure 19A:
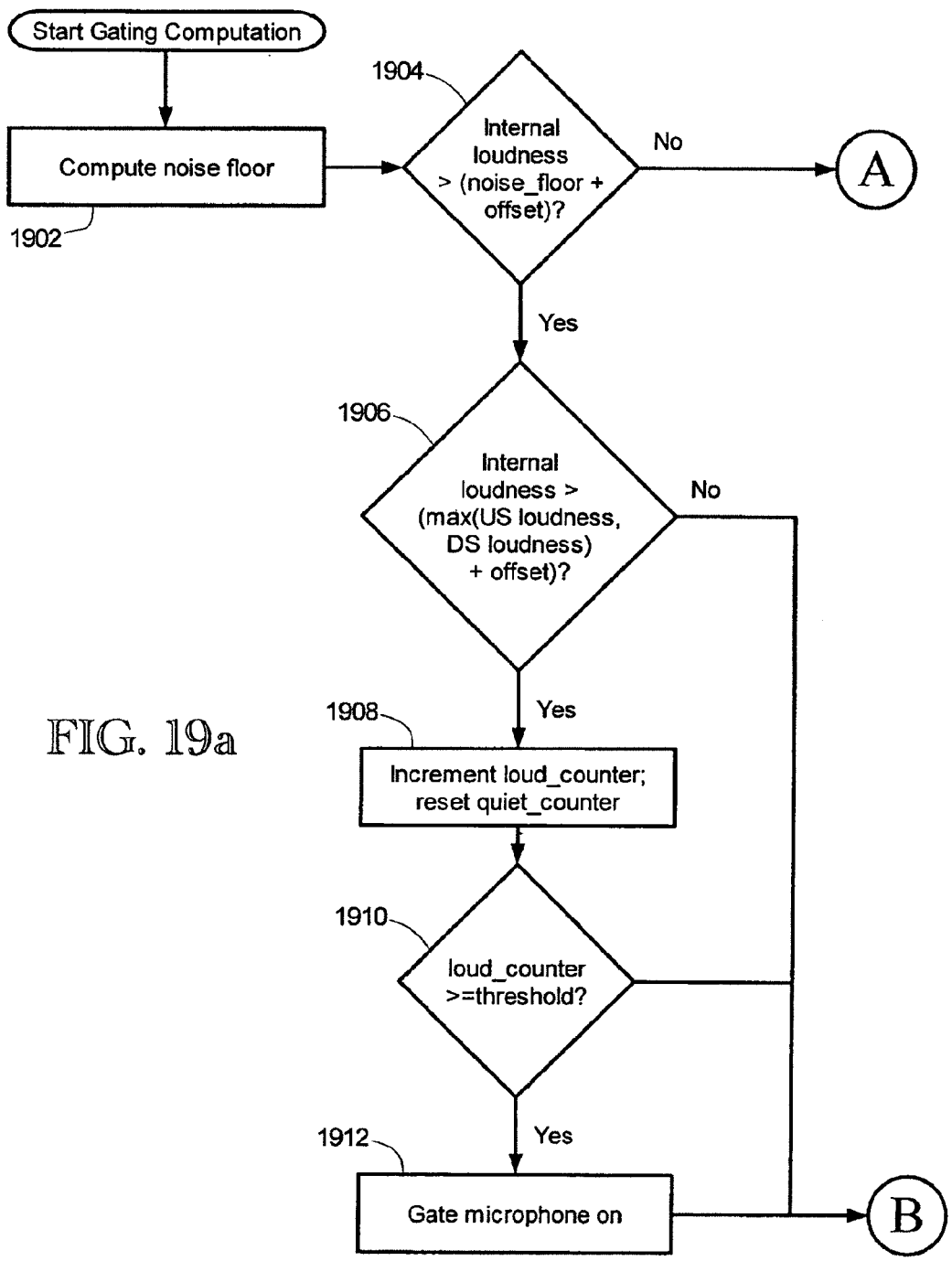
FIG. 19a shows an exemplary method of determining whether or not to gate a microphone in a pod.
Figure 19B:
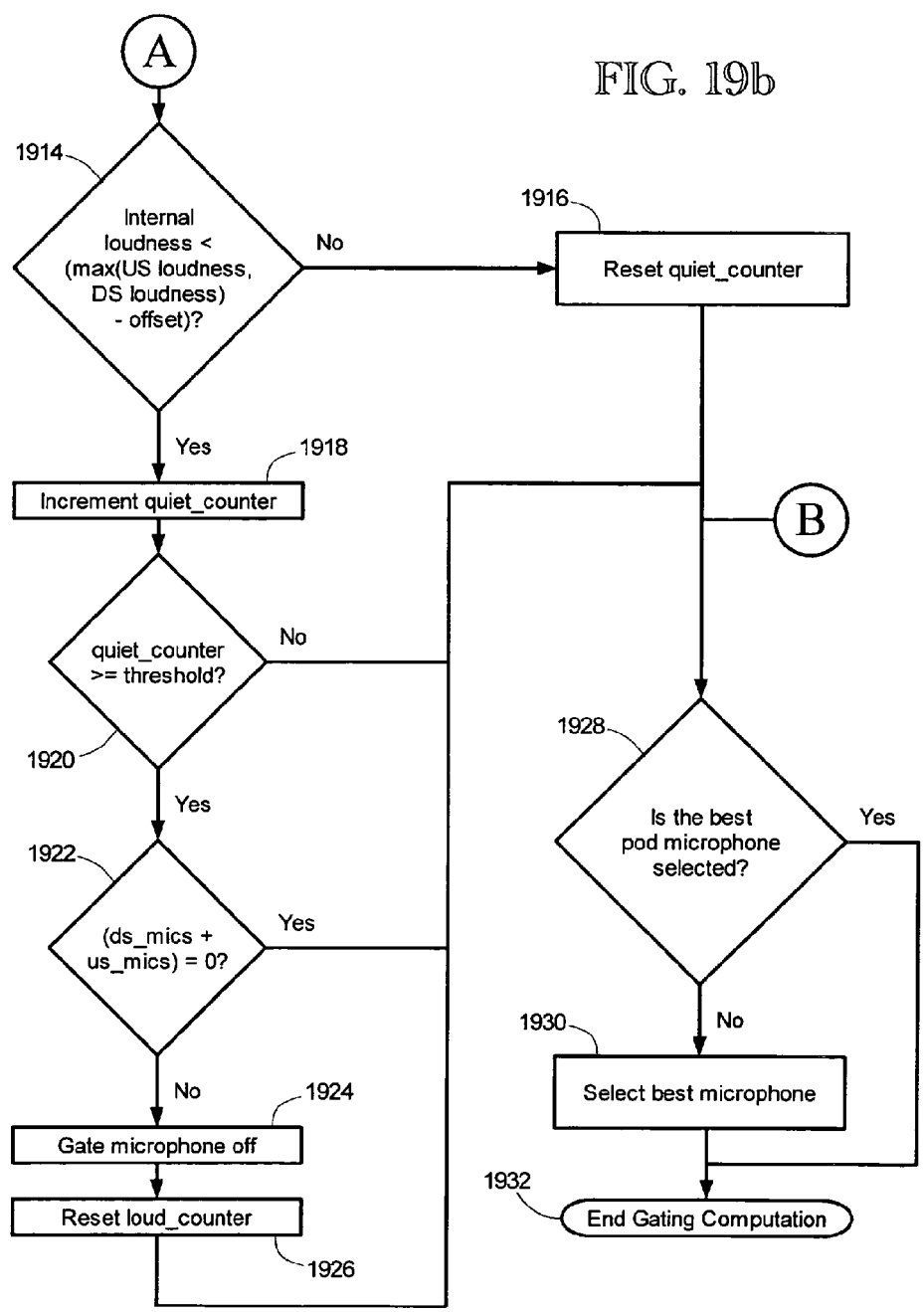
FIG. 19b shows an exemplary method of determining whether or not to gate a microphone off and of selecting a best microphone in a pod.

Depicted in FIGS. 19*a* and 19*b* is a subroutine for performing the gating computation mentioned for the method of FIG. 18. First, a noise floor calculation is performed in step 1902, which is further described for FIG. 20. The result of the noise floor computation is a value labeled "noise_floor," which is a dynamic value representing generally the level of ambient noise in the area of the pod. Following the computation of noise_floor, a comparison is made in step 1904 to determine if the level of loudness (the internal loudness value computed in step 1820) is greater than the ambient noise plus an offset. If the loudness is greater, the sound being received at the pod is considered to be loud enough for further consideration to gate the pod on. Otherwise, the sound level is determined to be too low to gate on, and execution of the subroutine continues at step 1914. The offset in step 1904 provides a degree of hysteresis to gating on, without which the pod might gate on at sporadic rises in the noise level in the room. The value of offset will depend on the intended environment of pod operation, however an offset equivalent to about 15 dB has yielded good results in normal circumstances.

Now it is considered desirable to limit the number of pods turning on in the exemplary method of FIGS. 19*a* and 19*b*. A pod should therefore not gate on if another pod is currently gated on and receiving only mildly softer input. By this criteria a person turning his head may not cause a second pod to gate on, but rather the originally gating pod will continue to provide the majority gain into the conference system. Likewise, if another pod becomes significantly louder, this is indicative of a second person speaking, and another pod is thereby permitted to gate on. To achieve this end, a comparison may be made between the internal loudness level and the external loudness level (the maximum of the upstream and downstream loudness levels), as in step 1906. Another hysteresis offset is applied to that comparison to slow the tendency to turn on pods that are only mildly louder than a pod currently gated on. The value of this offset will vary, depending at least on the distance between pods, for example. In a system locating having pods as described in FIGS. 8 and 9 spaced six feet apart, a value of 5 dB was found to yield good results.

If the loudness of the instant pod is found not to be significantly louder than other pods in the system in step 1906, execution in the method bypasses to step 1928. Otherwise, maintenance of two counters, a loud_counter and a quiet_counter are maintained. In this exemplary method, delays are introduced following detection of loud sounds or quietness. In the case of a delay after detection of loudness, it is desirable to wait for a propagation period of time, which is the period of propagation of upstream and downstream loudness information throughout the system. Thus, in a conferencing system of four pods linked together, a loud sound might be received at pods 1 and 4. The immediately received loudness by pod 1 from pod 2 would be too early, and would not reflect the information required to determine whether pod 1 or pod 4 should gate on. Pod 1 should therefore wait the period of time to propagate loudness information from pod 4 to 3, 3 to 2, and finally 2 to 1 before gating on. In the system described in FIG. 15, the propagation time from pod to pod might be about 1 ms. That given, a pod should wait at least 3-4 ms before gating on, to ensure that another pod is not better located to receive the sound. It may also be desirable to increase this delay by several more propagation times to ensure that loudness information has been received and to reject spurious electronic noise in the system.

Thus a counter called loud_counter is incremented in step 1908, which generally increments periodically at the propagation frequency so long as loudness is being detected. A quiet_counter is also reset, indicating that a period of quietness has ended. (Note that the loud_counter is reset in step 1926 at the time of gating off.) In step 1910, if the loud_counter has exceeded the threshold mentioned above, the pod is allowed to gate on in step 1912.

Continuing now to FIG. 19*b*, step 1914 begins a subprocedure on condition of quietness found in step 1904. In step 1914, the internal loudness is compared to the system loudness (which is again the maximum of the upstream and downstream reported loudness's). Another offset is applied to this comparison, whereby the loudness at this pod must fall below the system loudness with the offset subtracted, thus filtering out mild samples of quietness. If the comparison fails, this pod is not yet considered to be quiet, and the quiet_counter is reset in step 1916. Otherwise, the quiet_counter is incremented in step 1918 and compared against a threshold in step 1920. As alluded to above, the method does not permit spurious and short periods of relative quiet to cause the pod to gate off, and thus the quiet_counter is used to time that period. This period threshold should be chosen to be long enough to filter out pauses in volume between a participant's words and phrases, but short enough to disengage the pod at a reasonable time after speech has ceased. A period of about 0.5 second has been shown to yield good results.

If the period has not expired, the method continues to step 1928. Otherwise, a check is made to determine whether this pod is the only gated one in the system. As spoken of above, holding one microphone gated at all times gives the remote participants an indication that the conference is live and further provides continuity by maintaining a level of background noise. The system therefore includes in the loudness packets above the number of microphones currently being gated in the system. Thus, if the last pod has a microphone gated on, the system will propagate a count of one upstream in the chain. The result is that each pod may determine the values ds_mics and us_mics, which are the number of microphones gated on downstream and upstream. If there are other microphones gated in the system, the pod microphones are gated off in step 1924, and the loud_counter is reset in step 1926 to restart the delay period of loudness. If no other microphones are gated in the system other than in the present pod, steps 1924 and 1926 are bypassed, and execution continues at step 1928.

In step 1928 a procedure is started to select the best microphone in the pod. A determination of which microphone is best could take many forms. In one example, the microphone receiving the most sound might be considered the best. In another example, the microphone having the best signal-to-noise radio might be selected. Again, hysteresis might be applied to microphone selection to avoid unnecessary switches and audio artifacts during a conference. If needed, the system selects the best available microphone in step 1930, and the procedure ends.

Figure 20:
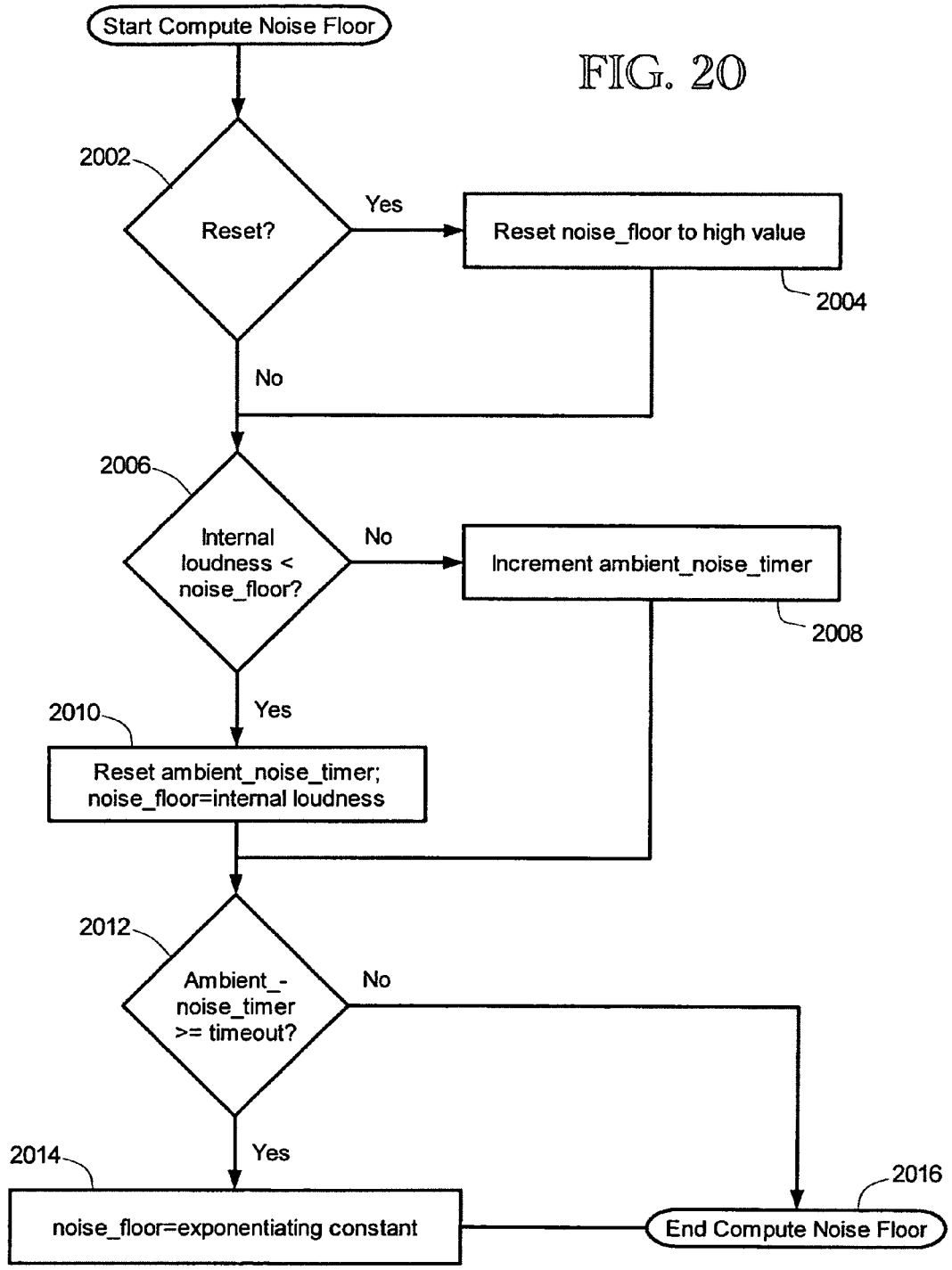
FIG. 20 shows an exemplary method of computing a noise floor value in a pod.

FIG. 20 depicts a procedure of calculating a noise floor, as might be done, for example, as step 1902 in the method of FIGS. 19*a* and 19*b*. In short, a noise_floor value is constantly updated while a pod is in operation, or participating in a conference. The value is reset to a high value, following which the value is set to the internal loudness value, if it is lower. After a short period of time, the value is permitted to decay upward toward the high value, and thereby make correction if the ambient noise increases.

Referring now to FIG. 20, in step 2002, a branch is made if a reset flag is set. If a reset has occurred, the noise_floor value needs to be reset to a high value as in step 2004 (selecting a high value in this method yields rapid convergence to the true noise floor). Periodically, in step 2006, the internal loudness calculated above is compared to this noise floor value. If the internal loudness is above the ambient_noise value, a counter labeled ambient_noise_timer is permitted to increment in step 2008. Otherwise, the system has discovered a new noise_floor value in step 2010, and the ambient_noise_timer is reset. Following either of steps 2008 and 2010, the ambient_noise_timer is checked for a timeout condition in step 2012. If a timeout has occurred, the noise_floor value is permitted to rise, in this example by multiplying the old value with a constant. Successive multiplication of a constant results in the noise_floor value taking on an exponential curve over successive iterations until a new noise floor is discovered.

As to the timeout period specified above, a relatively long value may be chosen, as the ambient noise conditions do not usually exhibit rapid changes. A timeout of about 5 seconds has been found to have good results.

As to the curve of a rising noise_floor, other curves than exponential may be chosen, if desired. In one example, a constant is added rather than multiplied to the noise_floor value, resulting in a linear sloped curve. Other examples might combine two or more curves, for example a linear curve for the first second and an exponential curve thereafter.

Now referring back to FIG. 19a, the delay introduced by steps 1908 and 1910 to gate a microphone on can have an unintended consequence. A person who abruptly begins speaking from a quiet state may have the first few milliseconds of his speech cut off. This may cause the system to fail to transmit about the first consonant, which can be noticeable to remote conference participants. To avoid this problem, the pods can buffer the audio, the buffer being sufficient to store the audio in the delay interval. If this is desired, the outgoing sound is delayed by this period at all times. In one example, this period is generally between 1 to 8 milliseconds. Now it will be recognized that if this delay becomes too long, it will become noticeable to the participants and potentially be a nuisance. It is expected that keeping this delay shorter than about 20 to 30 milliseconds will avoid that nuisance. The designer of a multi-pod conference system utilizing the above principles will therefore need to limit the number of pods in the system and/or utilize faster data communication paths to avoid noticeable audio delays, especially if many pods are utilized.

A system might also be configured to gate a default microphone on at the beginning of a connection in order to provide the live indication before loud sounds are detected by the system.

In an example of a conference system as shown in FIGS. 8, 9 and 15, also utilizing the above methods, gating and loudness information may be sent through the RS-232 bus approximately every 1 ms. The packet format is as follows:

| Byte number | Contents |
| --- | --- |
| 1 | Sync |
| 2 | Control |
| 3–4 | Loudest microphone level + number of microphones gated on |

The observant reader will notice that the above described methods define a distributed algorithm, wherein each pod makes a similar calculation utilizing the same input information across the system. Each pod, while computing and maintaining independent state, permits the collection of pods to act in concert as a system, as the behavior of each pod can be readily predicted and accounted for. Other algorithms might be fashioned, which might work equally well. In an alternate example, the base might receive loudness values from each of the connected pods and command which pods are to gate on and off. In a another alternate example, an iteration may encompass the period required to communicate the loudness information throughout the system, rather than the period required to transmit a packet between two adjacent pods. Many other algorithms, some variations on the above, might be utilized effectively under circumstances and/or assumptions as described above, or others, permitting the sharing of audio level information and gating of microphones in a multi-pod system.

Distributed Communication and Control

In a multi-pod conference system, it may be desired for one pod to include an input device, such as a keypad, for accepting actions or commands from a user to control the system. In that system, commands may be communicated effectively under a master-slave arrangement, whereby commands from the pod containing the keypad are received at the other pods in the system.

It may be desirable, however, to include a keypad in some or all pods of a conference system, permitting control at arm's reach of participants at several locations around a conference table. Going further, if all the pods include a keypad, the conference system becomes more uniform and modular. If all pods are required to include a keypad, only one type of pod need be manufactured and distributed, simplifying installation and use of the system.

Now the discussion below will discuss methods of controlling an exemplary conferencing system having multiple pods each having a keypad and display. It should be kept in mind that many, if not all of the methods described might be used in any conferencing system having multiple pods regardless of where keypads or other input devices are included. It should also be recognized that many input devices might be used rather than a keypad, such as touchpads, tablets, remote controls, etc.; although the below discussion will refer to a keypad, it is only a convenient example. Likewise, the location of displays might be varied from the example, or even omitted if other feedback is provided, such as audible feedback.

The exemplary conferencing system includes several pods and a base unit, as described above, the system connectible to a telephone line. Commands are transferred through the four-byte packet format described above, utilizing the sync and control bytes. If no command is to be send, a default value is sent for the sync byte, which in this example is 0x26. A different sync byte, in this example 0x27, is sent to indicate a command byte present in the control byte of the packet. Commands are sent by sending all bytes defined for those commands sequentially, which would be transferred in several successive packets for multi-byte commands. Each command begins with a header sequence, which is as follows:

| Byte Number | Contents |
| --- | --- |
| 1 | 0x28 (=command) |
| 2 | Command ID |
| 3 | Word count |
| 4 | Checksum (for the header and arguments) |

Any arguments to the command follow the header, with no ending marker for the command.

In the exemplary system, commands are only interpreted as they are received in the downstream direction (from the base). Key presses are communicated in the upstream direction, toward the base. When the base receives a key press from a pod, the key press is interpreted which may result in the generation of one or more commands to the connected pods. In the example of FIG. 15, this communication is over twisted pair 1506d in a cable between pods 1502 (or pod 1502) and the system base unit 1500.

In this exemplary system, all of the connected pods may be controlled by pressing keys on any pod, or by passing a command through the system to all pods and, in this example, the base. For example, if in a system having four pods as configured in FIG. 8, the "on/off" hook on pod 4 (the last pod) were pressed, pod 4 would send the key press to pod 3. Pod 3 transfers the key press to pod 2, pod 2 to pod 1, and pod 1 to the base. The base would then go on or off-hook, and send an appropriate enable command to pod 1. Pod 1 would receive the enable command, and transfer the command to pod 2. Pods 2, 3 and 4 would then each receive and pass the command in turn. Each pod, as it receives the enable command, changes its operational state accordingly, i.e., turns the speaker on/off, changes the display, etc. In this way, all pods may be switched on together when a conference is initiated. Likewise, all pods may be switched off when a conference is ended.

Other functions that may be distributed throughout a multi-pod system are volume controls and mute controls. By utilizing distribution of keypress commands the volume of all pods may be adjusted together, by which an even distribution of sound may be maintained. Likewise, distributing the mute function throughout the system protects from a local participant muting only one pod while unknowingly sending his speaking remotely over a different and unmuted pod.

An exemplary list of commands transmittable to a base and pods are listed in the following table:

| Command name and description | Command byte value | Argument length (in bytes) | Arguments |
|---|---|---|---|
| Mute (mutes or unmutes the outgoing audio) | 0 | 1 | Byte 0: 0=off, 1=on. |
| Speaker volume (sets the system pod speaker volume) | 1 | 1 | Byte 0: 1–16 |
| Ringer volume (sets the system finger volume) | 2 | 1 | Byte 0: 1–5 |
| Ringer selection (sets the system finger sound) | 3 | 1 | Byte 0: 1–5 |
| Ringer Enable/Disable (enables or disables the system ringer) | 4 | 1 | Byte 0: 0=enabled, 1=disabled |
| Ring Indication (indicates whether a ring is being received for display update and/or audible ring) | 5 | 1 | Byte 0: 0=ring ended, 1=ring started |
| Dial (dials a number) | 6 | 1–44 | Bytes 0–43: any of characters '0'–'9', '*', '#' and 'P' (for pause), terminated with a null character (0x00) |
| Enable (go on/off hook) | 7 | 1 | Byte 0: 0=off hook, 1=on hook |
| Flash (send a hook flash) | 8 | 0 | None |
| Dial type (set dial type) | 9 | 1 | Byte 0: 0=pulse, 1=tone |
| Flash duration (set flash duration) | 10 | 1 | Byte 0:1–4 (value in ims) |
| Speed dial (dial a speed dial number) | 11 | 1 | Byte 0: 0–9=0 to $9^{th}$ speed dial number, 10=last number (redial), 11=tech support, 12=conferencing services, 13=own number |
| Query settings (ask the base to send system settings) | 13 | 0 | |
| Play ringer (plays a ring sound without setting system) | 14 | 1 | Byte 0: 1–5 |
| Country select (sets the system country setting) | 15 | 1 | Byte 0: 1=US/Canada/Mexico, 2=Europe (CTR21), 3=Australia, 4=South Africa, 5=Japan/Brazil |
| Device ID (enumerates pod locations in system) | 16 | 1 | Byte 0: 0=base, 1–4=pod 1–4. |
| Maximum device ID (determines how many pods are connected) | 17 | 1 | Byte 0: number of pods in system (1–4) |
| Write memory (write the pod memories) | 18 | 8 | Byte 0: 'X'=DSP X data memory, 'Y'=DSP Y data memory, 'P'=DSP program memory, 'N'=NEC memory; Bytes 1–3: start address; Byte 4: count of addresses to write (1–3); Bytes 5–7: write values |
| Read memory (read the pod memories) | 19 | 5 | Byte 0: 'X'=DSP X data memory, 'Y'=DSP Y data memory, 'P'=DSP program memory, 'N'=NEC memory; Bytes 1–3: start address; Byte 4: count of addresses to read (1–3) |
| Write DSP vector (writes a vector to any of the system's DSPs) | 20 | 5 | Byte 0: 1=write vector only, 2=write value; Byte 1: vector; Bytes 2–4: value |
| Pod response (the response from any of the prior three commands) | 21 | 4 | Byte 0: Pod ID, Bytes 1–3: Value |
| Program mode (sets programming mode for pods) | 22 | 0 | None |
| Base version (send the base version to the pods) | 23 | 19 | Bytes 0–18: a string ending will NULL (0x00) |
| Pass through (sets the system pass through state) | 24 | 1 | Byte 0: 0=off; 1=pass through on pods, Base Telco In to |

-continued

| Command name and description | Command byte value | Argument length (in bytes) | Arguments |
|---|---|---|---|
| | | | Codec Out and Codec In to Telco Out; 2=mic switch, Base Telco In to Telco Out and Codec In to Codec Out |
| Version request (request the version of a pod) | 25 | 1 | Byte 0: 0=Pod controller version, 1=Pod DSP version |
| Version response (the response of a version request) | 26 | 20 | Byte 0: 0=Pod controller version, 1=Pod DSP version; Bytes 1–19: version string |
| Test mode (sets internal test mode) | 27 | 1 | Byte 0: mode |

For pod enumeration commands "Device ID" and "Maximum device ID" (16 & 17) above, a slightly different mode of operation is used. For the "Device ID" command, the command is initiated at the base with a value of 0. Upon receipt of that command, a pod takes the communicated value, increments it, and notes the new value as its position in the system. So a pod adjacent to a base determines an ID of 1, the next an ID of 2, and so forth. Following receipt of the "Device ID" command, each pod returns its determined value to the base using the "Maximum device ID" command. The base may know how many pods are in the system by waiting for the last "Maximum device ID" command to be received, and noting the returned ID.

In the above described communication procedure, it may be desirable to have a command buffer for each pod that may store an incoming command. This might be valuable, for example, if a pod is currently sending a key press upstream while receiving a command or key press from the adjacent downstream pod. Alternatively, a token passing or acknowledgment scheme may be used to either grant permission for an adjacent pod to send a new command or to acknowledge that one was successfully received.

Now the above described method of communicating commands and responses in a multi-pod conference system is only one example—many other possible modes of communication or operation might also be effectively used. For example, volume controls might be undistributed, permitting participants to adjust the level of a particular pod without changing the volume of others. Additionally, alternate connection schemes might be used. In one example, a star configuration is used, with each pod having assigned an identifier rather than the system relying on a pods positioned in a daisy-chain configuration. Rather than sending commands intended for all system pods, commands might also include the ID number (or address) of particular pods to respond and/or act on those commands. A system might also include a common communication bus, which might be wired or wireless. For a wireless bus, it may be useful to retain state at a base or a master unit and periodically update, to alleviate the possibility that one pod goes out of communications range and back. Many other modifications may be made to the communication facilities of the exemplary conference system described above while maintaining good operation, as will be understood by those skilled in the art.

Virtual Microphones

A conference system pod having multiple microphones may utilize virtual microphones, which are logical microphones formed by combinations of existing physical microphones in the pod. The use of virtual microphones can yield reduced common-mode noise, some examples of which are widespread noise in a room (for example the rumbling of a passing truck through the conference table), circuit-generated (power supply) noise, or RF noise (noise picked up from EM emissions to high-impedance microphones.) The use of virtual microphones may also be used to provide rejection of sound produced by a speaker arriving in-phase at microphones, as will be discussed below.

Figure 16:
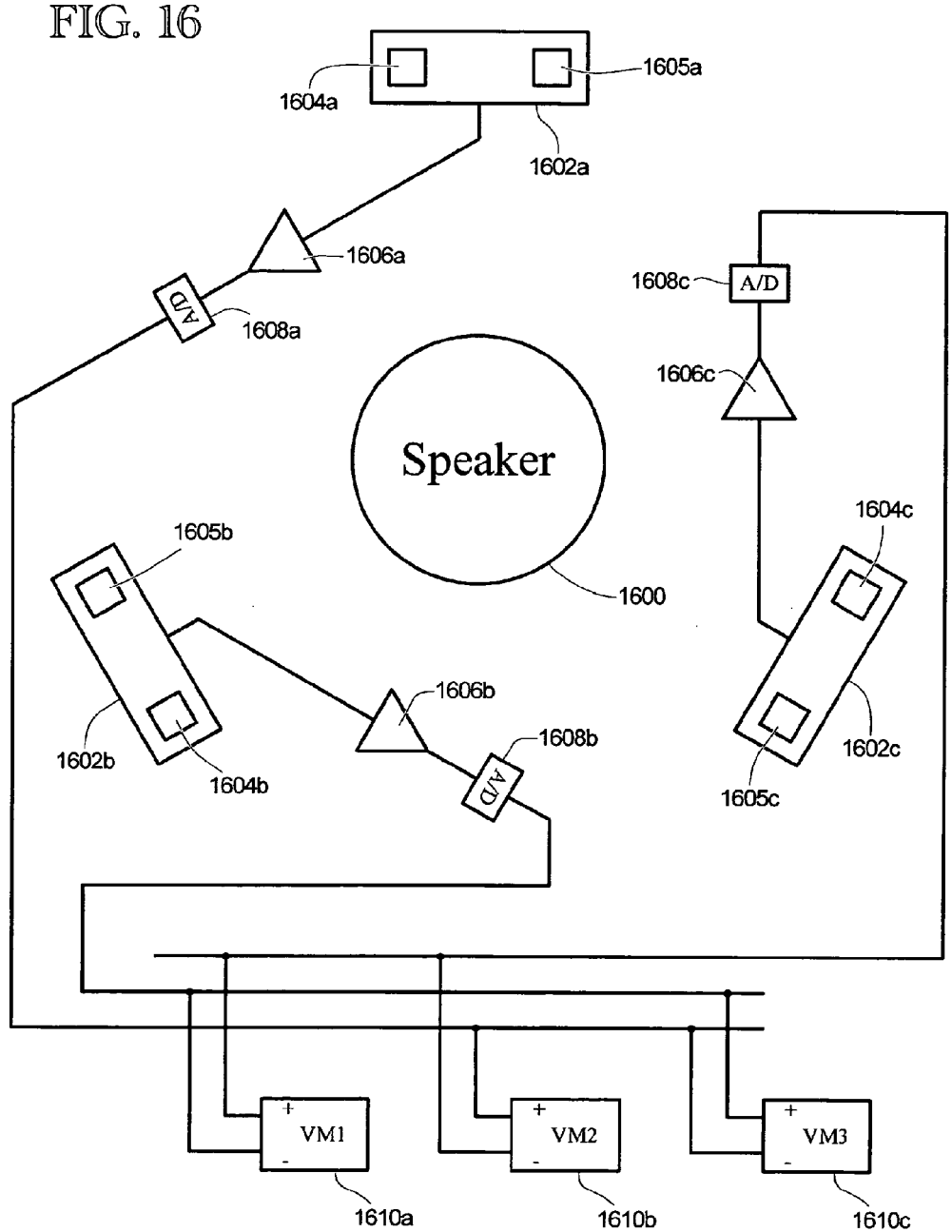
FIG. 16 depicts the arrangement of a speaker and three bi-polar microphones and further several virtual microphones in an exemplary pod.

Now referring to FIG. 16, the microphone and speaker configuration of earlier described pods is shown. A speaker 1600 is located at the center of the pod, with three bi-directional microphones 1602a-1602c surrounding at 120-degree intervals. Microphones 1602a-1602c each include two ports 1604a-1604c and 1605a-1605c. Each of microphones 1602a-1602c may include a singular element receiving sound from its corresponding ports on opposite poles of the element in a proper orientation considering the axis of sensitivity, by which the sound from one port is subtracted from the sound arriving at another port. Ports 1604a-1604c and 1605a-1605c are therefore placed where the sound from speaker 1600 travels a substantially equal distance to the microphone element. The sound arriving at one port is thereby seen by the system to be 180 degrees out of phase with the sound arriving at the other port, thereby defining a 0-degree phase and a 180-degree phase for each of microphones 1602a-1602c. Microphones 1602a-1602c might also be dual microphones, one microphone being a positive and the other a negative contributor to the received audio signal. In that case a subtracting circuit, perhaps using a low noise operational amplifier, might be used to perform the subtraction and optionally amplify the signal for analog to digital conversion. Another alternative is to do the subtraction in a processor digitally.

Further in the example of FIG. 16, the sound of each microphone is amplified by amplifiers 1606a-1606c, and converted to digital signals by analog to digital converters 1608a-1608c. Those digital signals are then taken differentially in three combinations, in this example, yielding three virtual microphones 1610a-1610c, as shown.

Figure 17:
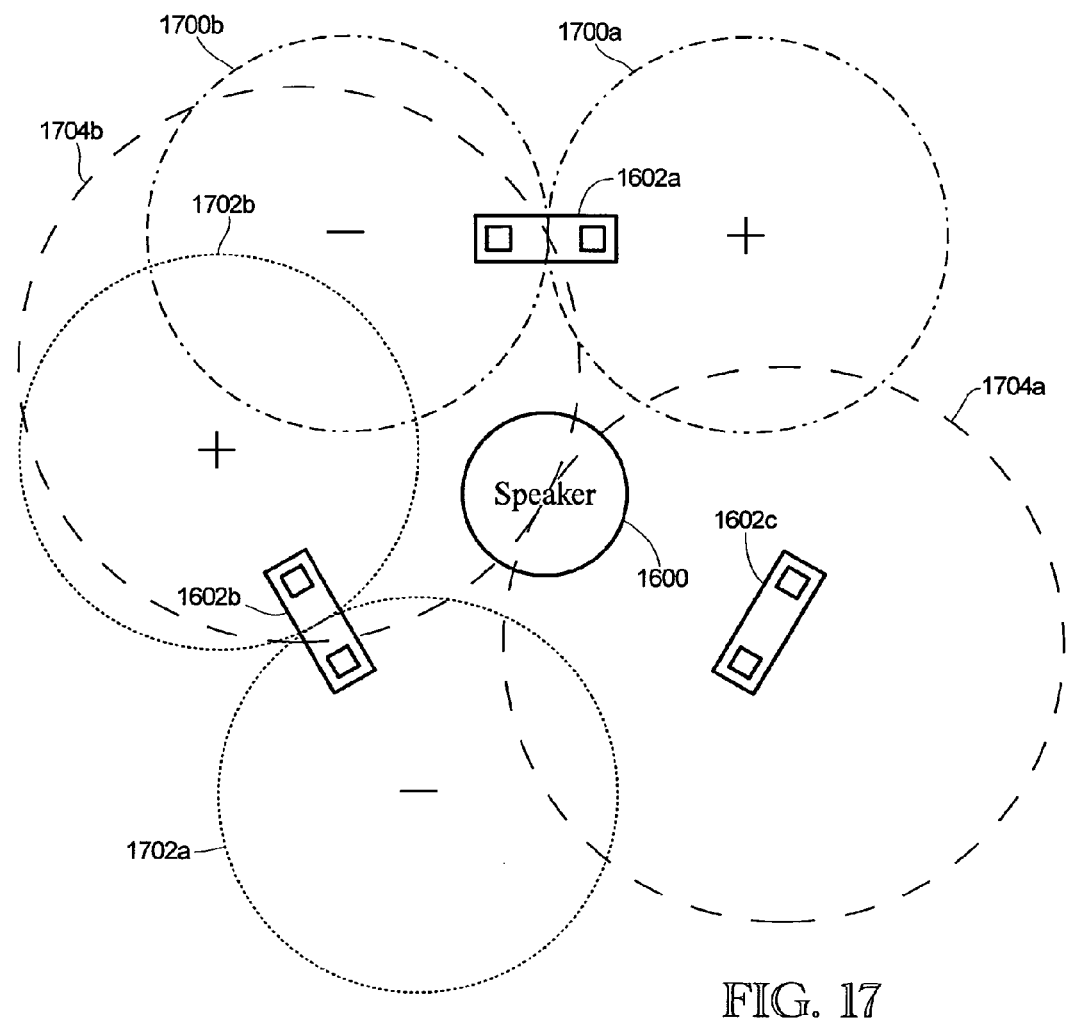
FIG. 17 depicts the audio lobes of sensitivity for the microphones and virtual microphones of the system depicted in FIG. 16.

FIG. 17 conceptually depicts the lobes of pickup for physical and virtual microphones as configured in FIG. 16. The lobes of microphone 1602a are shown, which are labeled 1700a and 1700b, one lobe for each phase of the microphone. The phases or poles of microphone 1602a are indicated by a "+" and "−" sign. The lobes of microphone 1602b are also shown and labeled 1702a and 1702b. The phases or poles of microphone 1602b are also indicated by a "+" and "−" sign. These lobes 1602a-1702b depict the areas of sensitivity for the phases of these bi-polar microphones, i.e., sound originating within the lobe will tend to be picked up better than the sound outside. For simplicity's sake, the lobes are shown as circles, which might be representative of the actual lobes if the microphones were suspended in free air. Although the true lobes would be somewhat different, given the fact they will be mounted inside an enclosure possibly accessible through ports, the description is sufficient to show the basic characteristics of these virtual microphones.

The combination of microphones 1602a and 1602b, which is represented by virtual microphone 3 labeled 1610c in FIG. 16, yields a virtual microphone having lobes 1704a and 1704b centered about the speaker. This can be seen by referring back to FIG. 16 where it is shown that the signals from microphone 1602a are negated and added to the signals from microphone 1602*b* to create virtual microphone 3, labeled 1610*c* in the diagram. When this is done, the negative lobe of microphone 1602*a* generates signals with the same polarity as the signals from microphone 1602*b*. The resulting virtual microphone lobes are labeled 1704*b* and 1704*a* in FIG. 17. The actual microphone pickup pattern will be somewhat distorted from the schematic representation shown in FIG. 17. In particular, lobe 1704*a* will not have the same shape as lobe 1704*b*. The virtual microphone lobes show a zero about the speaker, which is largely caused by the cancellation of bipolar microphones 1602*a* and 1602*b*. The main pickup lobe 1704*b* makes the virtual microphone sensitive to sounds away from the center of the pod and between the combined microphones, at about 6 dB increased sensitivity as compared to its component microphones. Now in order to achieve the lobe labeled 1704*b*, the polarity of microphones 1602*a* and 1602*b* should be the same (i.e., if pole 1604*a* is positive, then 1604*b* should be positive, and vice versa. This ensures that the audio received at the two nearest poles are positively combined, resulting in the strongest pickup of a speaker within lobe 1704*b*. Two other virtual microphones each with respective lobes 120 degrees rotated from the center of the speaker can be formed by the other two microphone combinations, which are not shown.

It is possible to combine two unipolar microphones to achieve a similar effect, however it should be kept in mind that if the two microphones are not equidistant from the speaker, echo may become a larger issue that may require enhanced echo cancellation. It is also possible to combine four, six or any even number of microphones to achieve other virtual microphones, if more microphones are provided in a system.

The reason for the low noise and/or better signal-to-noise radio of virtual microphones is as follows. Power supply noise tends to be seen by the system microphones in common, i.e., noise on a ground or power supply will arrive largely equally at all of the microphones, amplifiers and A/D converters. That is also true of EMI: as EM radiation travels near the speed of light, the effects tend to be seen equally by all microphones sampled at a relatively low (audio frequency) rate. By subtracting the input of one microphone from another, this common-mode interference is canceled out. Synchronized sampling of all the A/D converters in the system may improve noise rejection, if the common mode noise is high-frequency or "glitchy" in nature (this is because the noise may be changing so rapidly that the noise may be sampled differently by different converters if they are not synchronized). The use of sample-and-hold circuits, low-pass filters or relatively large loads at the A/D inputs may also provide for better common-mode noise rejection.

Now a system may use virtual microphones alone, or virtual microphones in combination with real microphones as desired. If both are used, it may be desirable to multiply the output of the virtual microphones (or the real microphones) by a scaler if the sensitivity is different between the two.

While electronic conferencing systems incorporating pods have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed:

1. A multi-pod conferencing system for local conference participants to communicate with remote conference participants, the multi-pod conferencing system comprising;
    a base unit including a base controller configured to communicate audio signals with the remote conference participates over a carrier medium; and
    a plurality of pods separate from, and operably coupled to, the base unit, wherein each pod of the plurality of pods comprises:
        a pod processor;
        a loudspeaker operably coupled to the pod processor;
        a digital to analog converter operably coupled to the loudspeaker, the digital to analog converter configured to convert digital audio to analog audio for sound reproduction by the loudspeaker;
        a plurality of physical microphones connected to a pair of audio ports with each audio port being equal distance from the loudspeaker;
        an analog to digital converter operably coupled with the plurality of physical microphones, the analog to digital converter configured to convert the analog audio to digital audio for processing by the pod processor; and
        a plurality of virtual microphones for reducing common-mode noise, each virtual microphone of the plurality of virtual microphones formed from a combination of at least two outputs from the plurality of the physical microphones,
    wherein the analog to digital converters for each pod of the plurality of pods are configured for synchronized sampling with the analog to digital converters of the other pods of the plurality of pods in the multi-pod conferencing system.

2. The multi-pod conferencing system of claim 1, wherein the carrier medium that comprises at least one of a telephone line and a voice over internet protocol network.

3. The multi-pod conferencing system of claim 2, wherein the plurality of virtual microphone further provide common-mode noise rejection.

4. The multi-pod conferencing system of claim 1, wherein pod processor is configured to support full duplex operation.

5. The multi-pod conferencing system of claim 1, wherein each pod of the plurality of pods makes a contribution to a summed audio output starting at the last pod in a chain for the plurality of pods and ending in the base unit.

6. The multi-pod conferencing system of claim 1, wherein the pod controller comprises a plurality of distributed processors that are configured to separately control audio and control functions of the pod.

7. The multi-pod conferencing system of claim 1, wherein the plurality of physical microphones are selected from the group consisting of unipolar microphones and bipolar microphones.

8. The multi-pod conferencing system of claim 1, wherein a polarity of the physical microphones are the same.

9. The multi-pod conferencing system of claim 1, wherein the base unit is configured to perform echo cancellation of local audio.

10. The multi-pod conferencing system of claim 1, wherein the pod processor is further configured to perform:
    pod echo cancellation for sound between the virtual microphone and said loudspeaker; and
    microphone gating for determining the best virtual microphone to gate on or off by using a loudness value, a quietness counter, and a noise floor value, wherein a constant gain is maintained by attenuation being applied to each gated microphone if more than one microphone is gated on at the same time.

11. A method of manufacturing a virtual microphone system for reducing common-mode noise for an individual pod that is part of a multi-pod conferencing system, the method comprising:

providing a base unit having a base processor for communicating audio signals to remote conference participants; and providing a plurality of pods that are coupled to, and separate from, the base unit, wherein providing the plurality of pods comprises:

providing a pod processor for providing audio processing for various pod functions;

coupling a loudspeaker to a digital to analog converter and the pod processor, the digital to analog converter configured to convert digital audio from the pod processor to analog audio to the loudspeaker;

coupling an analog to digital converter to a plurality of physical microphones that are configured to sample analog audio in a synchronized manner with sampling performed by analog to digital converters of other pods of the virtual microphone system;

connecting the plurality of physical microphone a plurality of audio ports with each audio port being equal distance from the loudspeaker; and coupling the physical microphones with the pod processor, such that outputs from the plurality physical microphones are combined forming a plurality of virtual microphones for reducing common-mode noise.

12. The method of claim 11, further comprising coupling the base unit with a carrier medium that comprises at least one of a telephone line and a voice over internet protocol network.

13. The method of claim 11, wherein forming the plurality of virtual microphones comprises providing common-mode noise rejection.

14. The method of claim 11, wherein providing a pod processor includes a pod processor configured to perform echo cancellation of sound between the plurality of virtual microphones and the loudspeaker, and perform determining the best virtual microphone to gate on or off by using a loudness value, a quietness counter, and a noise floor value.

15. A method of using a virtual microphone system for a multi-pod conferencing system, the method comprising:

communicating local audio to remote participants through a base unit and coupled with a plurality of pods, wherein communicating further comprises:

audio processing using a pod processor;

converting digital audio to analog audio with a loudspeaker that coupled to a digital to analog converter and the pod processor;

converting sampled analog audio to digital audio using an analog to digital converter coupled to a plurality of physical bi-polar microphones positioned in the horizontal resting plane of each individual pod of the plurality of pods, each individual physical microphone connected to a pair of audio ports with each audio port being equal distance from the loudspeaker, the physical microphones coupled to the pod processor, wherein the sampled analog audio is synchronized with sampling performed by other analog to digital converters from other pods of the virtual microphone system; and creating a plurality of virtual microphones for reducing common-mode noise, the plurality of virtual microphones are formed by combining outputs from the plurality of physical microphones.

16. The method of claim 15, further comprising a carrier medium that comprises a telephone line, wherein the base unit comprises a base echo cancellation means for echo cancellation of local audio.

17. The method of claim 15, wherein the virtual microphone means further comprises providing common-mode noise rejection.

18. The method of claim 15, wherein audio processing using the pod processor includes:

echo cancelling sound using pod echo cancellation means for echo cancellation of sound between the virtual microphone and the loudspeaker; and determining the best virtual microphone to gate on or off using a loudness value, a quietness counter, and a noise floor value.

19. The method of claim 15, further comprising communicating audio data between the pod and the base unit.

20. The method of claim 19, wherein communicating between the pod and the base unit employs spread spectrum techniques to the audio data.

* * * * *